(12) United States Patent
Matsuda et al.

(10) Patent No.: US 8,763,744 B2
(45) Date of Patent: Jul. 1, 2014

(54) VEHICLE HOOD MOVING DEVICE

(71) Applicant: Fuji Jukogyo Kabushiki Kaisha, Tokyo (JP)

(72) Inventors: Hiroshi Matsuda, Tokyo (JP); Hiroshi Ozawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/737,564

(22) Filed: Jan. 9, 2013

(65) Prior Publication Data

US 2013/0192917 A1 Aug. 1, 2013

(30) Foreign Application Priority Data

| Jan. 26, 2012 | (JP) | 2012-014154 |
| Jan. 26, 2012 | (JP) | 2012-014156 |
| Jan. 26, 2012 | (JP) | 2012-014157 |
| Jan. 26, 2012 | (JP) | 2012-014158 |

(51) Int. Cl.
*B60R 21/38* (2011.01)

(52) U.S. Cl.
CPC ..................................... *B60R 21/38* (2013.01)
USPC .................. 180/274; 296/187.04; 296/187.09

(58) Field of Classification Search
CPC .... B60R 21/38; B60R 21/34; B60R 2021/34; B60R 2021/343; B60R 2021/346; E05B 77/08; E05Y 2900/536
USPC ......... 180/274, 271, 69.21, 69.2; 296/187.03, 296/187.04, 187.09, 193.11; 701/45
See application file for complete search history.

(56) References Cited

U.S. PATENT DOCUMENTS

| 2002/0171262 A1 * | 11/2002 | Ozawa ........................... 296/189 |
| 2011/0282538 A1 * | 11/2011 | Tamura et al. .................. 701/29 |

FOREIGN PATENT DOCUMENTS

| DE | 10163820 A1 * | 7/2003 | ............. B62D 25/10 |
| JP | 2007-1539 A | 1/2007 | |
| JP | 2007-38955 A | 2/2007 | |
| JP | 2008007064 A * | 1/2008 | |
| KR | 2011-011211 A * | 2/2010 | |

* cited by examiner

*Primary Examiner* — Keith Frisby
(74) *Attorney, Agent, or Firm* — Smith, Gambrell & Russell, LLP

(57) ABSTRACT

There is provided a vehicle hood moving device for a vehicle having a hood movably supported at a vehicle body front. The hood moving device includes a first magnet disposed in the hood, a second magnet provided to the inside of an engine room and disposed so as to face the first magnet, a collision detecting sensor to detect that a pedestrian collides with the vehicle, and a collision predicting device to detect whether or not a pedestrian has a danger of colliding with the vehicle. When detection is made with these sensors and predicting device that a pedestrian has collided with the vehicle or has a danger of colliding with the vehicle, the hood is moved as to the vehicle body by magnetic force of the first magnet and second magnet. The second magnet is an electromagnet, and the first magnet is a permanent magnet.

19 Claims, 25 Drawing Sheets

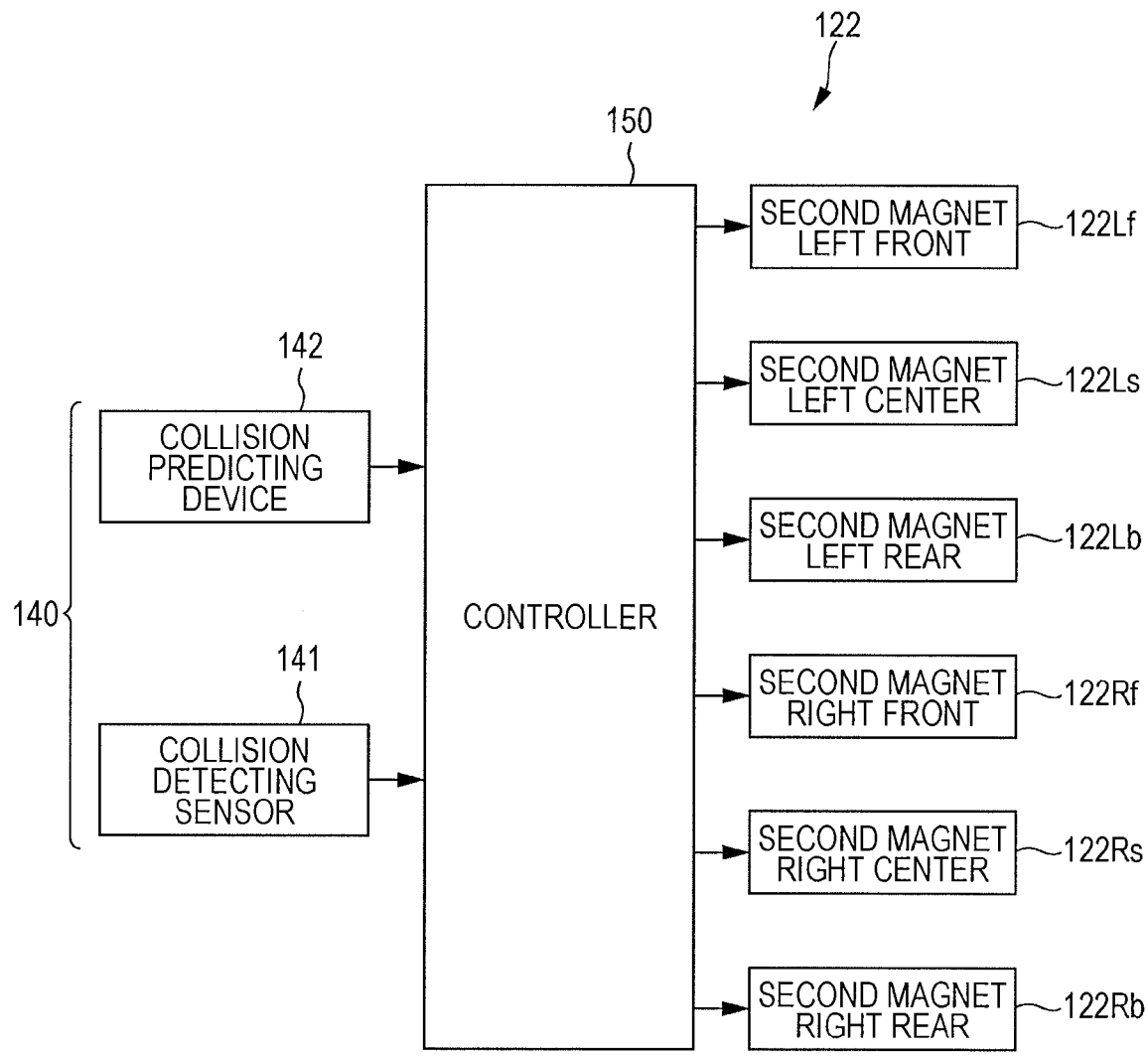

VEHICLE HOOD MOVING DEVICE

CROSS REFERENCES TO RELATED APPLICATIONS

The present application claims priority from Japanese Patent Application No. 2012-014156 filed on Jan. 26, 2012, Japanese Patent Application No. 2012-014157 filed on Jan. 26, 2012, Japanese Patent Application No. 2012-014158 filed on Jan. 26, 2012, and Japanese Patent Application No. 2012-014154 filed on Jan. 26, 2012, the entire contents of which are hereby incorporated by reference.

BACKGROUND OF THE INVENTION

1. Field of the Invention

The present invention relates to a vehicle hood moving device configured to absorb shock at the time of a pedestrian colliding with a front hood, and a pedestrian protection apparatus for a vehicle configured to prevent a pedestrian who has collided with a vehicle and fallen onto a front hood from falling from the front hood, and a pedestrian protection apparatus for a vehicle capable of absorbing shock of a pedestrian who has collided with a vehicle, using a front hood.

2. Description of the Related Art

In the event that a traveling vehicle has collided with a pedestrian, the pedestrian may have secondary collision on the hood upper face of the vehicle body front. Therefore, heretofore, at the time of collision of a pedestrian with a vehicle, there has been performed absorption of shock at the time of the pedestrian colliding with a vehicle front hood by letting the hood bound (see Japanese Unexamined Patent Application Publication No. 2007-1539).

Now, examples of shock that a pedestrian who has collided with a vehicle receives include secondary collision against the hood, and shock received by falling onto the road surface from above the hood.

Therefore, a hood control device configured to prevent a pedestrian from falling on the road surface from above the hood has been developed (see Japanese Unexamined Patent Application Publication No. 2007-38955). This device lets the front edge of the hood bound to form space to absorb shock in the event of a pedestrian having collided with the vehicle, and then lets the rear side of the hood bound to form space to absorb shock when the pedestrian falls onto the hood, and further lets the front edge of the hood bound to incline the hood to the backward side, thereby preventing the pedestrian from falling on the road surface.

These existing devices configured to move the hood have been provided to a vehicle body, and a cylinder configured to perform expansion/contraction using gas pressure or gunpowder explosion has been employed, but many components are disposed in the engine room, and accordingly, space for disposing the cylinder within the engine room is restricted. Also, movement of the hood is restricted to the expansion/contraction direction of the cylinder, or only inclination according to letting only part of the hood bound. Therefore, there may be cases where the danger of a pedestrian who has fallen onto the hood falling from the hood, may not be prevented.

Also, the existing devices move the hood by expanding/contracting the cylinder, and accordingly, movement of the hood is restricted to only the corresponding vertical direction and inclination, and a movement of the hood may be insufficient for preventing a pedestrian from falling onto the road surface from above the hood. Also, the time in which a pedestrian's collision with a vehicle, secondary collision on the hood, and falling onto the road surface from above the hood occurs is very short, and accordingly, expansion/contraction of the cylinder according to gas pressure has a problem in responsiveness. On the other hand, with expansion/contraction of the cylinder according to gunpowder explosion, complicated movement of the hood is difficult.

Also, in the event of employing a mechanism using magnetic force according to a magnet such as a permanent magnet or electromagnet or the like as a mechanism to let the hood bound, iron sand or dust may be absorbed by magnetic force at the time of operation of the mechanism to let the hood bound, resulting in a fitting portion being blocked with the iron sand or dust, which may affect operation, and uncomfortable sound may occur. Also, in the event of employing an electromagnet, when there is a strong electromagnetic field in the vicinity, this electromagnetic field may also adversely affect operation of the electromagnet which is an actuator.

SUMMARY OF THE INVENTION

The present invention has been made in the light of such a problem, and it is an object of the present invention to provide a vehicle hood moving device which is high in responsiveness, and also high in flexibility in the movement direction of the hood, enabling a unit to move the hood to be installed in the engine room in a space saving manner.

Further, it is an object of the present invention to provide a vehicle hood moving device which is high in flexibility in the movement direction of the hood, whereby deterioration in operation can be prevented.

Also, it is an object of the present invention to provide a pedestrian protection apparatus for a vehicle whereby there can be reduced a danger that a pedestrian who has fallen onto the hood at the time of collision with a vehicle will fall from the hood.

In order to achieve the above-mentioned objects, an aspect of the present invention is a hood moving device of a vehicle (automobile 1 according to an embodiment) having a hood at a vehicle body front with the hood being movably supported at the vehicle body front, the hood moving device including: a first magnet disposed in the hood; a second magnet disposed in a position facing the first magnet of the vehicle body front; and a pedestrian collision detector (pedestrian collision detector 40 according to an embodiment) configured to detect whether a pedestrian has collided with the vehicle or has a danger of colliding with the vehicle; with the hood moving device moving the hood as to the vehicle body by magnetic force of the first magnet and the second magnet in the event that detection is made by the pedestrian collision detector that a pedestrian has collided with the vehicle or has a danger of colliding with the vehicle.

At least one of the first magnet and the second magnet may be an electromagnet.

The vehicle hood moving device may further include a hood movement controller (controller 50 according to an embodiment) configured to excite the one made up of the electromagnet of the first magnet and the second magnet to move the hood in the event that detection is made by the pedestrian collision detector that a pedestrian has collided with the vehicle or has a danger of colliding with the vehicle.

A linear motor may be configured of the first magnet and the second magnet, with the hood movement controller controlling, in the event that detection is made by the pedestrian collision detector that a pedestrian has collided with the vehicle or has a danger of colliding with the vehicle, switching of excitation of the one made up of the electromagnet of the first magnet and the second magnet to move the hood as to the vehicle body.

The hood may be movably supported in at least either direction of the front/back direction and the horizontal direction as to the vehicle body.

The rear side of the hood may be rotatably supported in the vertical direction as to the front side of the hood via a hinge mechanism included in the vehicle body front, with either one of the first magnet and the second magnet being provided to the hinge mechanism, and the other of the first magnet and the second magnet is provided to the vehicle body front, and the hood movement controller exciting, in the event that detection is made by the pedestrian collision detector that a pedestrian has collided with the vehicle or has a danger of colliding with the vehicle, the one made up of the electromagnet of the first magnet and the second magnet to move the rear side of the hood upward as to the front side of this hood along with the hinge mechanism.

Another aspect of the present invention provides a hood moving device of a vehicle (automobile 1 according to an embodiment) having a hood at a vehicle body front with the hood being movably provided to the vehicle body front, the hood moving device including: a first magnet disposed in the hood; a second magnet disposed in a position facing the first magnet of the vehicle body front; an electromagnetic field suppression member (electromagnetic shield according to an embodiment) disposed so as to cover both or one of the first magnet and the second magnet; and a pedestrian collision detector (pedestrian collision detector 40 according to an embodiment) configured to detect whether a pedestrian has collided with the vehicle or has a danger of colliding with the vehicle; with the hood moving device moving the hood as to the vehicle body by magnetic force of the first magnet and the second magnet in the event that detection is made by the pedestrian collision detector that a pedestrian has collided with the vehicle or has a danger of colliding with the vehicle.

The electromagnetic field suppression member may cover a portion excluding a surface where the first magnet and the second magnet face.

Another aspect of the present invention provides a pedestrian protection apparatus for a vehicle that includes: a hood held in the inner side of a pair of fenders disposed on both sides in the vehicle-width direction on the vehicle body front side of a vehicle (automobile 101 according to an embodiment); a plurality of moving units (moving devices 121 according to an embodiment) configured to move the hood; a pedestrian collision detector (pedestrian collision detector 140 according to an embodiment) configured to detect whether a pedestrian has collided with the vehicle or has a danger of colliding with the vehicle; and a hood movement controller (controller 150 according to an embodiment) configured to control operation of the moving units according to a detection signal from the pedestrian collision detector, and the hood movement controller controls, in the event that detection is made by the pedestrian collision detector that a pedestrian has collided with the vehicle or has a danger of colliding with the vehicle, operation of the moving units to actively move the hood closer to the inner side of the vehicle body than a state of the hood before this detection.

The hood movement controller may move, in the event that detection is made by the pedestrian collision detector that a pedestrian has collided with the vehicle or has a danger of colliding with the vehicle, at least part of the hood to a position further downward than the pair of fenders.

Another aspect of the present invention provides a pedestrian protection apparatus for a vehicle that includes: a hood held on the front side of the vehicle body of a vehicle (automobile 201 according to an embodiment); a plurality of moving units (moving devices 221 according to an embodiment) configured to move the hood; a pedestrian collision detector (pedestrian collision detector 240 according to an embodiment) configured to detect whether a pedestrian has collided with the vehicle or has a danger of colliding with the vehicle; and a hood movement controller (controller 260 according to an embodiment) configured to control operation of the moving units according to a detection signal from the pedestrian collision detector, and the hood movement controller controls, in the event that detection is made by the pedestrian collision detector that a pedestrian has collided with the vehicle or has a danger of colliding with the vehicle, operation of the moving units to perform sliding movement of the hood to the front side of the vehicle.

The pedestrian protection apparatus for a vehicle may further include: with a deformation originator serving as a starting point of deformation being provided to the front side of the hood, a deforming unit (deforming device 250 according to an embodiment) configured to deform the hood more front side than the deformation originator in a state facing downward along with sliding movement of the hood.

There may be provided between the vehicle body and the hood a motion conversion member configured to regulate sliding movement of the hood, and also to rotate a rear side as to the front side of the hood in the vertical direction.

As described above, with a vehicle hood moving device according to an aspect of the present invention, according to the above-mentioned features being included, there can be provided a vehicle hood moving device which is high in responsiveness, and also high in flexibility in the movement direction of the hood, enabling a unit to move the hood to be installed in the engine room in a space saving manner, and further deterioration in operation can be prevented.

Also, according to the present invention, according to the above-mentioned features being included, there can be provided a pedestrian protection apparatus for a vehicle whereby there can be reduced a danger that a pedestrian who has fallen onto the hood at the time of collision with a vehicle will fall from the hood.

Also, according to the present invention, according to the above-mentioned features being included, there can be provided a pedestrian protection apparatus for a vehicle which is high in flexibility in the movement direction of the hood.

BRIEF DESCRIPTION OF THE DRAWINGS

FIG. 20 is a block diagram of a pedestrian protection apparatus for a vehicle according to an embodiment of the present invention;

FIG. 21A is an explanatory diagram in the event that the entire hood has moved downward, FIG. 21B is an explanatory diagram in the event that the rear side of the hood has moved downward, and FIG. 21C is an explanatory diagram in the event that the front side of the hood has moved downward;

FIG. 28A is an explanatory diagram in the event that the hood is positioned in a normal position, FIG. 28B is an explanatory diagram in the event that the hood has moved upward, and FIG. 28C is an explanatory diagram in the event that the hood has moved forward and also turned upward.

DESCRIPTION OF THE PREFERRED EMBODIMENTS

Hereafter, a preferred embodiment of a vehicle hood moving device according to the present invention will be described based on FIGS. 1 to 15. First, the front side of a vehicle where the vehicle hood moving device is provided will briefly be described with reference to FIGS. 1, 2, and 3. Note that, with the present embodiment, an automobile will be described as an example of a vehicle.

Figure 1:
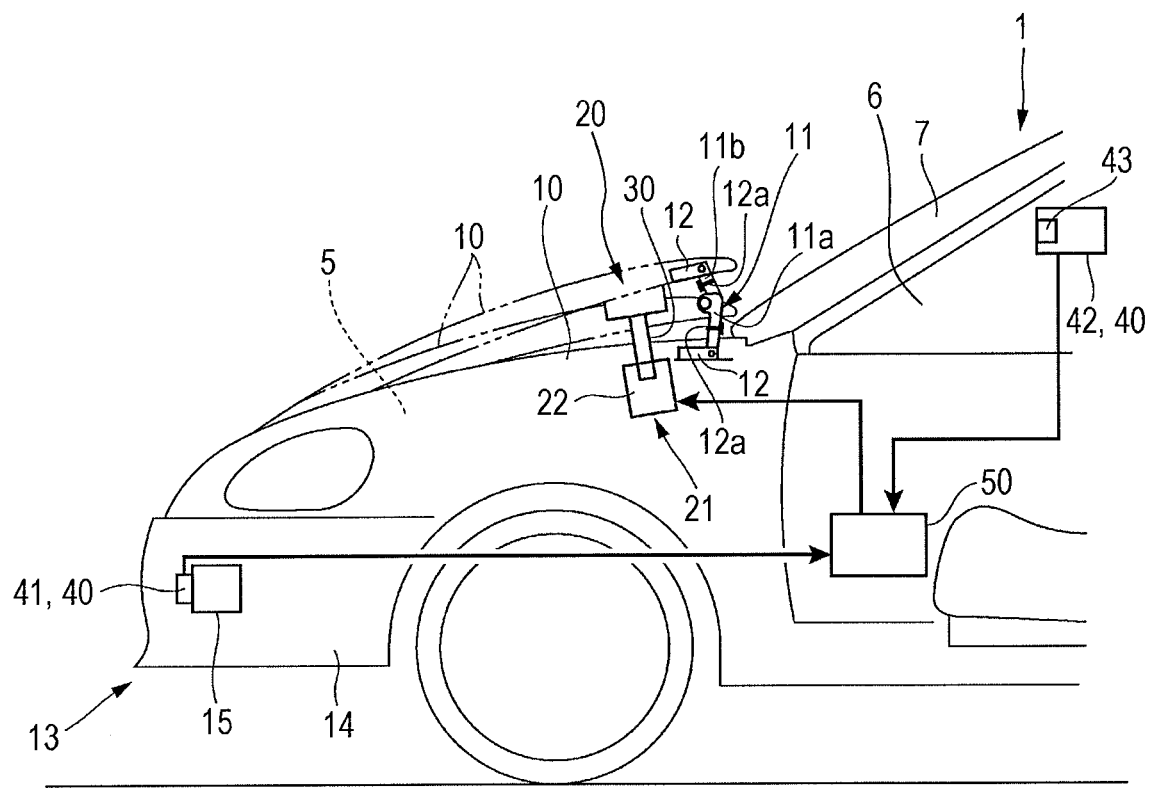
FIG. 1 is an explanatory diagram for describing a side face side of the front side of a vehicle where a vehicle hood moving device according to an embodiment of the present invention is provided.
Figure 2:
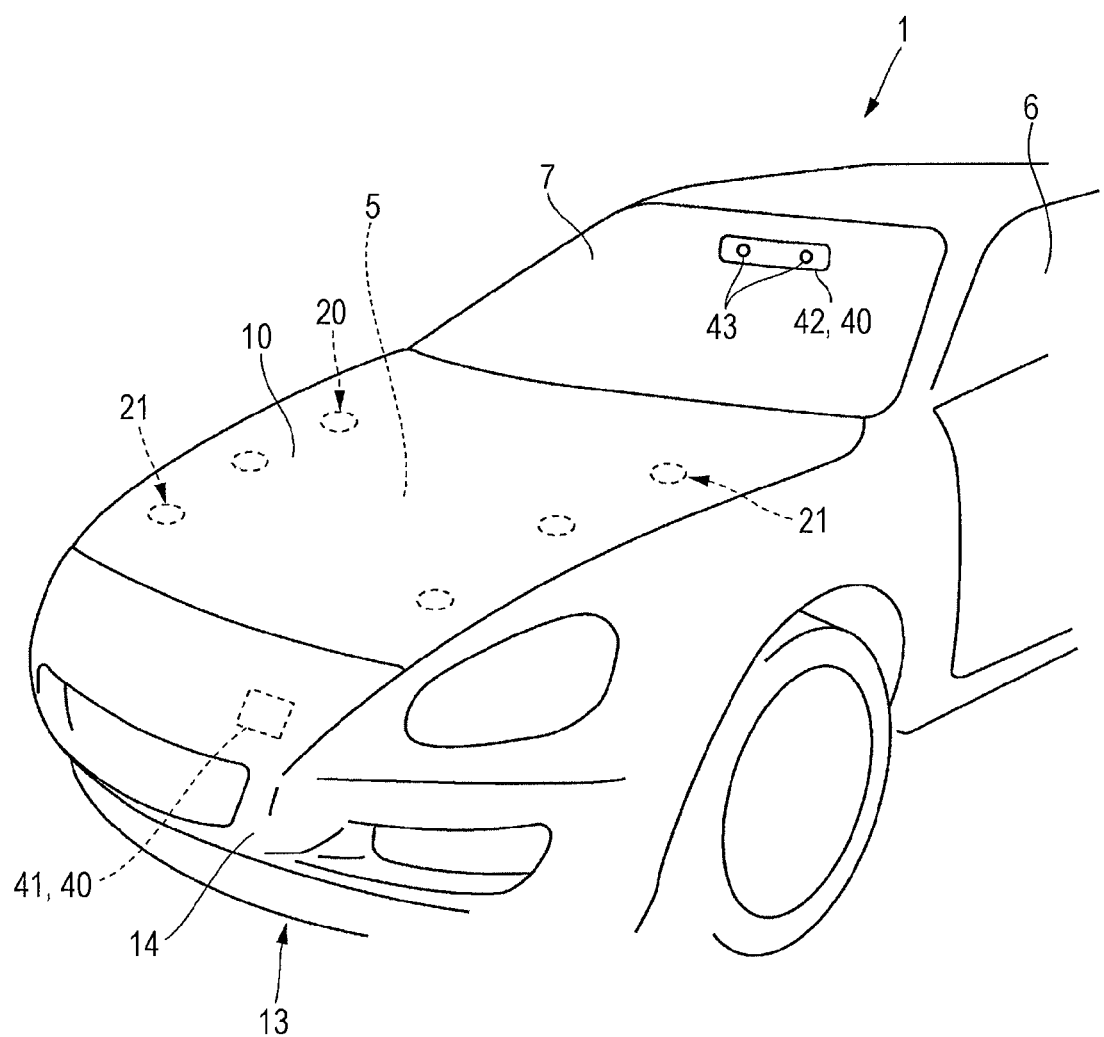
FIG. 2 is a perspective view of the front side of the vehicle where the vehicle hood moving device is provided.
Figure 3:
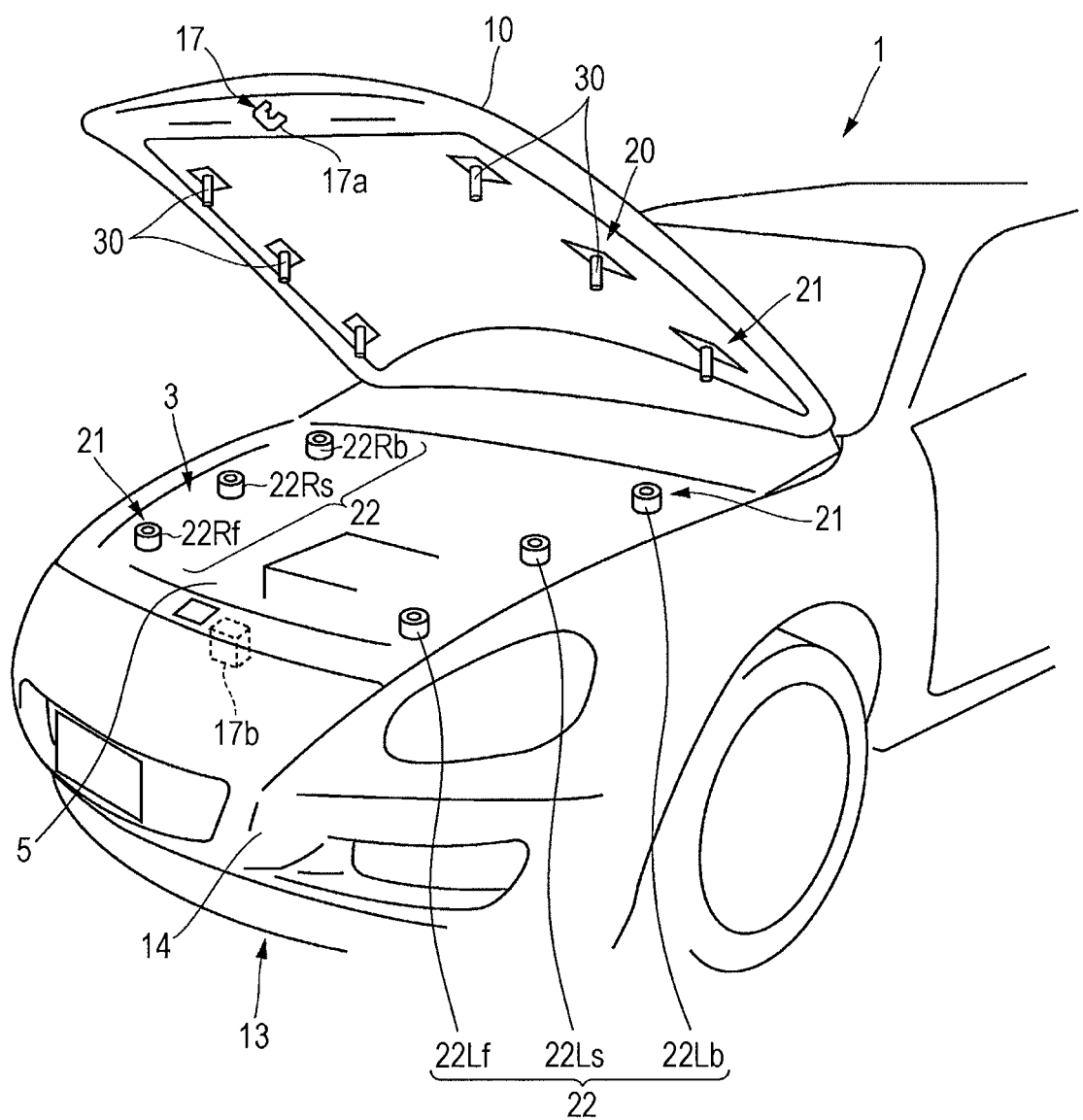
FIG. 3 is a perspective view of the front side of the vehicle in a state in which the hood of the vehicle is opened.

With the front side of the body 3 of an automobile 1, as illustrated in FIGS. 1, 2, and 3, an engine room 5 is provided, and the upper portion of this engine room 5 is covered with a hood 10. A front bumper 13 is disposed on the front edge of the body 3. This front bumper 13 includes a bumper face 14 and a bumper beam 15 disposed on the inner side thereof and extending in the vehicle-width direction. The bumper beam 15 is fixed to a body frame which is not illustrated, of which the shape and intensity have been designed to rebound in a direction where the shape is restored by elasticity at the time of collision of a collision object of interest (pedestrian).

The hood 10 is supported at the body 3 with opening-free/closing-free via a pair of hood hinges 11 provided to both sides of the vehicle-width direction of the rear edge thereof. The hood hinges 11 are configured of two link members 11a and 11b being turnably connected, and also a fixed plate 12 being turnably connected to the edges of the link members 11a and 11b. One of the fixed plates 12 is fixed to the body 3 by a bolt or the like, and the other of the fixed plates 12 is fixed to the rear face of the hood 10 by a bolt or the like. Therefore, the rear side of the hood 10 can be moved freely in the vertical direction by turning of the two link members 11a and 11b. The hood hinges 11 usually support the rear side of the hood 10 in a folded state, the one link member 11a in a folded state is connected to the body 3 via a fracture bolt 12a, and the other link member 11b is connected to the hood 10 via a fracture bolt 12a. The fracture bolt 12a is fractured by pressing upward according to a later-described moving device 21 at the time of collision or when there is a danger of collision as will be described later, which allows turning of the pair of link members 11a and 11b, thereby allowing movement upward of the hood 10. The front edge of the hood 10 is locked to the body side by a hood lock device 17. The hood lock device 17 includes a lock striker 17a provided to the hood side, a latch (not illustrated) which is turnably provided to the body side and can lock and unlock the lock striker 17a, and an unlock actuator 17b which turns the latch to forcibly unlock the lock striker 17.

The unlock actuator 17b is an actuator which is driven by electric power being supplied according to a command from a later-described controller 50 (e.g., solenoid, motor, or the like). The unlock actuator 17b turns the latch at the time of electric power being supplied to unlock the locked state of the lock striker 17a. Accordingly, the hood 10 is opened from the front side in a state supported by the body 3 via the hood hinges 11 in a folded state. Note that, in FIG. 3, for convenience of description, though the hood 10 is illustrated in a state in which the front side is opened upward with the rear edge side thereof as a supporting point, at the time of driving, as illustrated in FIG. 2, the hood 10 is in a state covering the engine room 5, and is held by the hood hinges 11 and hood lock device 17.

Next, the overall configuration of the hood moving device 20 will be described with reference to FIGS. 1 to 6. The hood moving device 20 is configured of a moving device 21 which moves the hood 10, a pedestrian collision detector 40 which detects whether a pedestrian has collided with the vehicle or has a danger of colliding with the vehicle, and a controller 50 which causes the moving device 21 to move the hood 10 as to the body 3 in the event of detecting that a pedestrian has collided with the vehicle or has a danger of colliding with the vehicle, using the pedestrian collision detector 40.

The moving device 21 includes, as illustrated in FIGS. 2 and 3, multiple first magnets 30 disposed on both sides of the vehicle-width direction of the rear face of the hood 10 with a predetermined interval in the front/back direction, and multiple second magnets 22 disposed on both sides of the vehicle-width direction of the engine room 5 with a predetermined interval in the front/back direction. The first magnets 30 and second magnets 22 are disposed so as to face each other so that the hood 10 covers the engine room 5. The first magnets 30 are permanent magnets, and the second magnets 22 are electromagnets.

Figure 4:
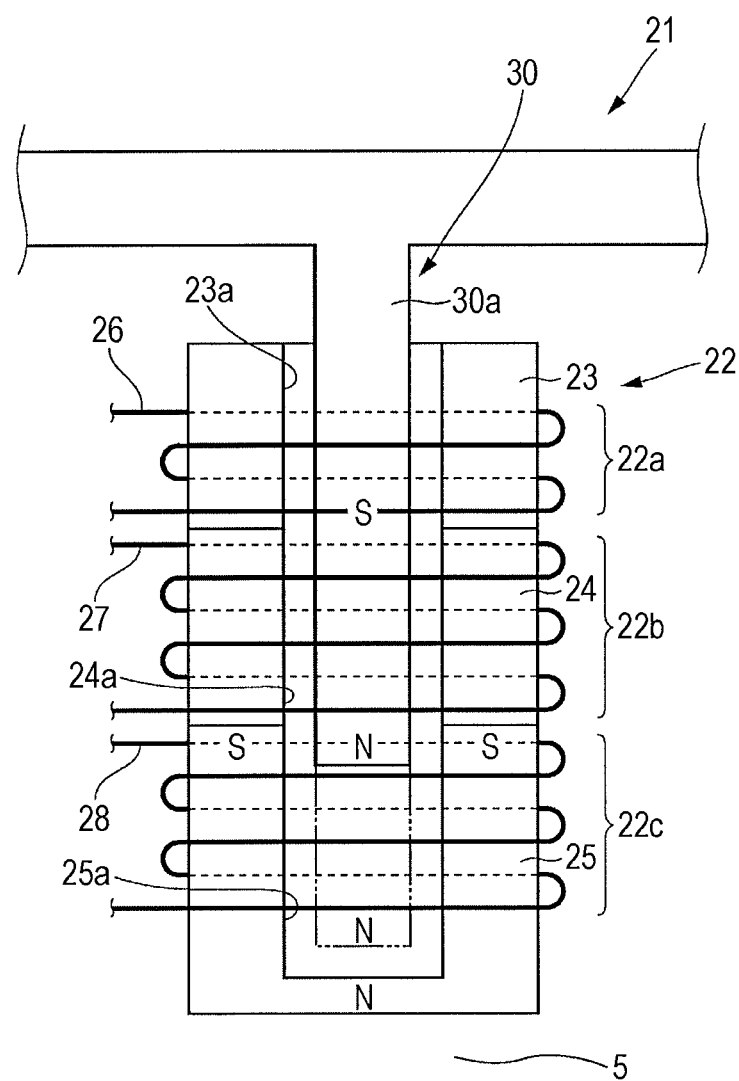
FIG. 4 is a configuration diagram of a moving device which moves the hood.

The configurations of the first magnets 30 and second magnets 22 will be described with reference to FIG. 4. First, the second magnets 22 will be described. The second magnets 22 include, as illustrated in FIG. 4, cylindrical iron cores 23, 24, and 25 formed so as to continue three steps from upward to downward, and coils 26, 27, and 28 wound around these iron cores 23, 24, and 25 respectively, and are installed in the engine room 5 so that the hole portions 23a, 24a, and 25a within the iron cores face the vertical direction. Note that, for convenience of description, a portion disposed on the upper portion of the second magnet 22 will be referred to as a second magnet 22a, a portion disposed on the intermediate portion in the vertical direction will be referred to as a second magnet 22b, and a portion disposed on the lower portion will be referred to as a second magnet 22c. The coils 26, 27, and 28 are electrically connected to a controller (see FIG. 1), to which electric power is supplied, or power supply is blocked. In the event of electric power being supplied to the coils 26, 27, and 28 of the second magnet 22, the lower edges of the corresponding iron cores 23, 24, and 25 become the N pole, and the upper edges thereof become the S pole. Also, when changing the current direction of electric power to be supplied, the lower edges of the corresponding iron cores 23, 24, and 25 become the S pole, and the upper edges thereof become the N pole.

Figure 5:
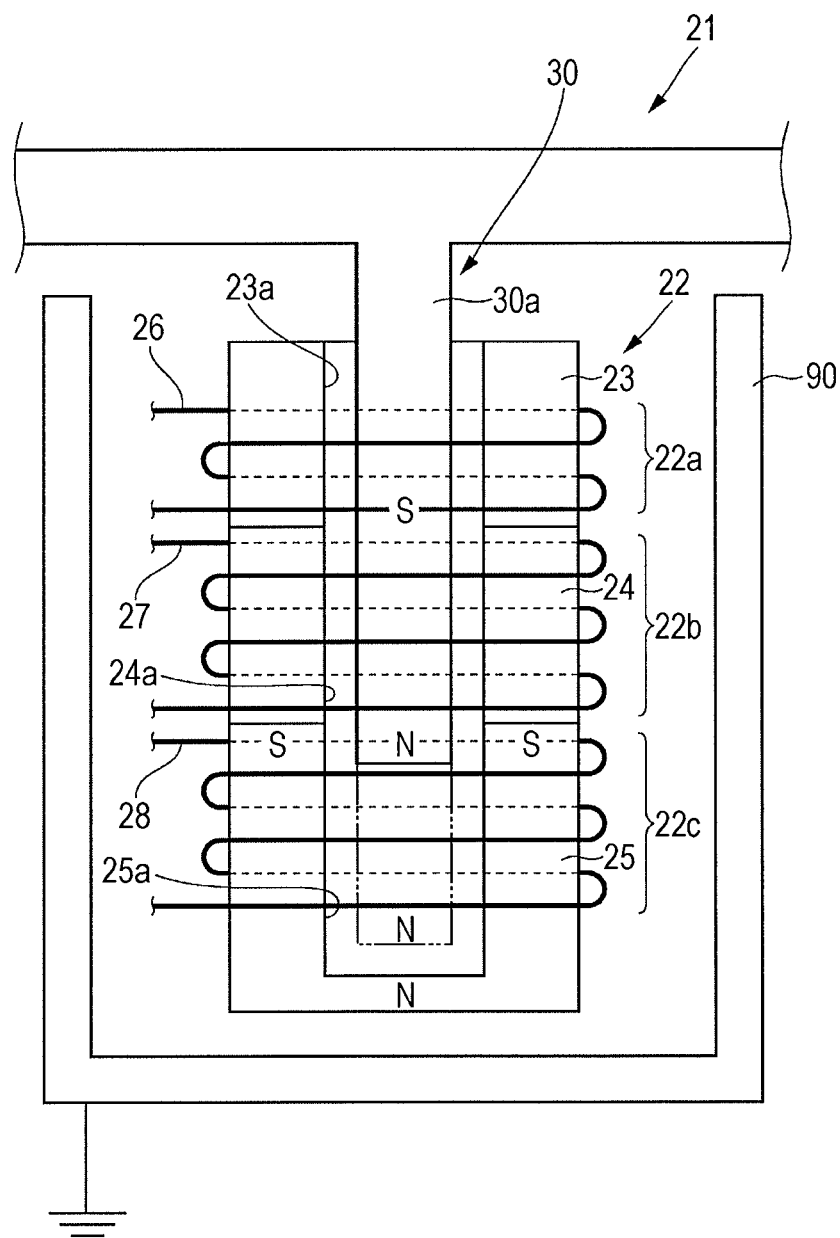
FIG. 5 is a configuration diagram of a moving device which moves the hood.
Figure 6:
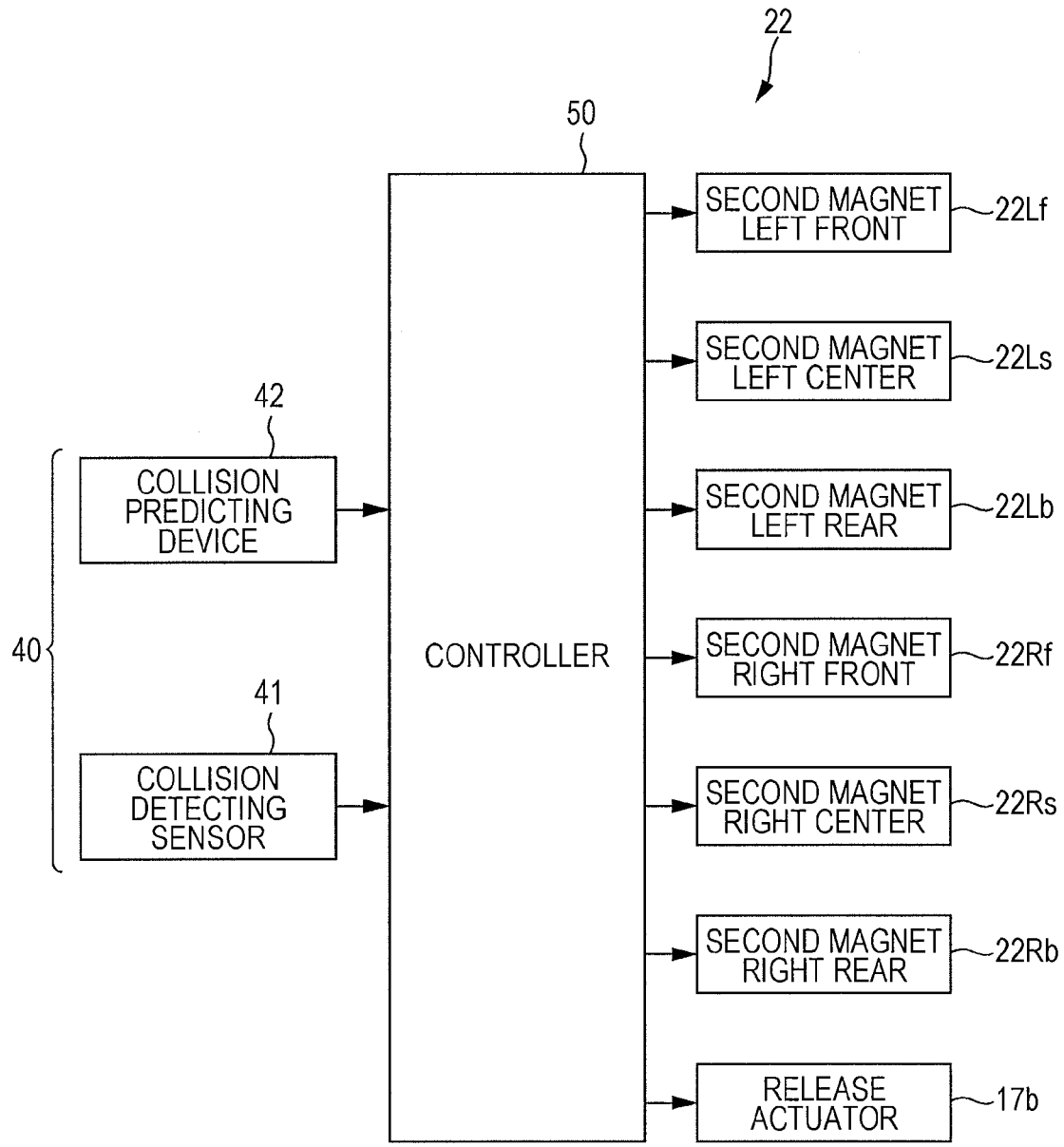
FIG. 6 is a block diagram of a vehicle hood moving device according to an embodiment of the present invention.

With the second magnets 22, the outer circumference and bottom thereof may be covered with an electromagnetic shield 90 (electromagnetic field suppressing member) as illustrated in FIG. 5. The electromagnetic shield 90 is a member which reflects or shields or weakens the electromagnetic field. Examples of the electromagnetic field suppressing member include a member having electro-conductivity, electro-conductive synthetic resin, carbon fiber union cloth, carbon being dispersed in urethane foam, foam metal, iron plate, copper plate, aluminum plate, metal mesh plate, electro-conductive coating material, and plating. The thicknesses of these, and the size of a mesh hole can be changed according to wavelength of electromagnetic waves to be shielded. Note that the electromagnetic shield is grounded as appropriate.

According to this electromagnetic shield 90, iron sand and dust can be prevented from being absorbed due to magnetic force at the time of operation. Also, influence on operation of the electromagnet can be suppressed by preventing external electromagnetic fields.

The first magnets 30 are permanent magnets where an iron core 30a extends in a rod shape, and are extractably inserted into the hole portions 23a, 24a, and 25a of the second magnets 22a, 22b, and 22c. The bottom of the iron core 20a is excited to the N pole, and the intermediate portion of the iron core 30a is excited to the S pole. The S pole is disposed above the N pole, having length much longer than the length in the vertical direction of the second magnets 22a, 22b, and 22c. Therefore, in the event that in a state in which the iron cores 30a of the first magnets 30 are inserted into the hole portions 23a, 24a, and 25a of the second magnets 22, electric power is supplied to the coil 28 disposed in the lower portion of the second magnet 22c, the lower side of this second magnet 22c is excited to the N pole, and the upper side is excited to the S pole. Accordingly, according to magnetic force (repelling force) between the N pole of the second magnet 22c and the N pole of the first magnet 30, and magnetic force (repelling force) between the S pole of the second magnet 22c and the S pole of the first magnet 30, the first magnet 30 is pulled up and moved in the second magnet 22b.

Also, in the event that in a state in which electric power is supplied to the second magnet 22c, electric power is supplied to the coil 27 of the second magnet 22b, the bottom of the iron core 24 of the second magnet 22b is excited to the N pole, and the top of the iron core 24 is excited to the S pole. In this state, when power supply to the second magnet 22c is blocked, the second magnet 22c is in a non-excited state, according to magnetic force (attraction force) between the S pole of the second magnet 22b and the N pole of the first magnet 30, and magnetic force (attraction force) between the N pole of the second magnet 22b and the S pole of the first magnet 30, the first magnet 30 is further pulled up and moved in the second magnet 22a.

On the other hand, in a state in which the first magnets 30 are pulled up, when supplying electric power to the second magnet 22b so that current in the opposite direction of the above-mentioned case flows into the second magnet 22b, the lower side of the second magnet 22b is excited to the S pole, and the upper side is excited to the N pole. Therefore, according to magnetic force (attraction force) between the S pole of the second magnet 22b and the N pole of the first magnet 30, magnetic force (attraction force) between the N pole of the second magnet 22b and the S pole of the first magnet 30, and the gravity of the hood 10, the first magnet 30 moves downward, and moves into the second magnet 22b. Similarly, in a state in which the second magnet 22b is excited, when supplying electric power to the second magnet 22c so that current in the opposite direction of the above-mentioned case flows into the second magnet 22c, the iron core of the first magnet 30 moves downward, and the first magnet 30 moves into the second magnet 22c.

That is to say, power supply to the coils 27 and 28 of the second magnets 22b and 22c is controlled, whereby the vertical position of the first magnet 30 can be adjusted. Therefore, power supply to the second magnet 22 is controlled, whereby the first magnet 30 can be moved in a direction separated from/closer to the second magnet 22. Accordingly, the locked state of the hood 10 by the hood lock device 17 provided to the front edge side of the hood 10 illustrated in FIG. 3 is unlocked, whereby the hood 10 can be moved in the vertical direction by the moving device 21. Note that, for convenience of description, as illustrated in FIG. 3, the second magnet 22 disposed on the left side in the vehicle-width of the engine room 5 will be referred to as second magnet left-side 22Lf, the second magnet 22 disposed in the intermediate portion in the vehicle-width of the engine room 5 will be referred to as second magnet left-center 22Ls, and the second magnet 22 disposed in the intermediate portion in the front/back direction on the left side in the vehicle-width of the engine room 5 will be referred to as second magnet left-rear 22Lb. Also, the second magnet 22 disposed in front on the right side in the vehicle-width direction of the engine room 5 will be referred to as second magnet right-front 22Rf, the second magnet 22 disposed in the intermediate portion in the front/back direction on the right side in the vehicle-width of the engine room 5 will be referred to as second magnet right-center 22Rs, and the second magnet 22 disposed in the rear portion on the right side in the vehicle-width direction of the engine room 5 will be referred to as second magnet right-rear 22Rb.

Next, a collision detecting sensor and a collision predicting device will be described with reference to FIGS. 1 and 2. A collision detecting sensor 41 is, as illustrated in FIGS. 1 and 2, attached to the front face of the bumper beam 15, and converts collision load into an electric signal and outputs this. The collision predicting device 42 includes a camera 43 disposed in the central portion in the vehicle-width direction on the rear face side of a front glass 7 within a vehicle room 6, and is configured to predict whether or not there is a danger that a pedestrian will collide with the vehicle from an imaged image in front of the vehicle taken by the camera 43, and to output this.

Next, the controller 50 will be described with reference to FIGS. 1, 5, and 7. The controller 50 supplies, as illustrated in FIGS. 1 and 5, electric power to the second magnet 22 and unlock actuator 17b according to a detection signal from the collision detecting sensor 41 and collision predicting device 42, or blocks power supply thereto. Specifically, in the event of having received an electric signal corresponding to the collision load from the collision detecting sensor 41, the controller 50 determines whether or not this electric signal is collision load at the time of collision of a pedestrian, and when determining that this electric signal is collision load at the time of collision, supplies electric power to the unlock actuator 17b to unlock the locked state of the hood 10 using the hood lock device 17, and also supplies electric power to the coil 28 of the second magnet left-rear 22Lb and second magnet right-rear 22Rb. Accordingly, the first magnets 30 inserted into the second magnet left-rear 22Lb and second magnet right-rear 22Rb are pulled upward, the fracture bolts 12a provided to the link members 11a and 11b are fractured, the hood hinges 11 are extended upward from the folded state, and the hood 10 is in a state in which the front side is inclined. Here, according to the size of collision load at the time of collision, when supplying electric power to the coils 27 and 26 of the second magnets 22b and 22c, the hood 10 can be inclined to the front side in a state in which the inclined angle is further increased.

Also, in the event of having received a detection signal to the effect that there is a danger that a pedestrian will collide with the vehicle, in the same way as with the case from the collision detecting sensor 41, the controller 50 supplies electric power to the unlock actuator 17b to unlock the locked state of the hood 10 using the hood lock device 17, and also in the event of having supplied electric power to the coils 28 of the second magnet left-rear 22Lb and second magnet right-rear 22Rb, the first magnets 30 inserted into the second magnet left-rear 22Lb and second magnet right-rear 22Rb are pulled upward, the fracture bolts 12a provided to the link members 11a and 11b are fractured, the hood hinges 11 extend upward from the folded state to change the hood 10 into a state inclined to the front side. Note that the controller 50 adjusts the inclination angle of the hood 10 according to a danger level that a pedestrian will collide with the vehicle from the collision predicting device 42. The adjustment of the inclination angle of the hood 10 conforms to the case of the collision detecting sensor 41, and accordingly, description thereof will be omitted. Note that, though the collision detecting sensor 41 and collision predicting device 42 are connected to the controller 50, in the event of having received at least a signal to the effect that a pedestrian has collided with the vehicle or will collide with the vehicle from either of the devices, the controller 50 inclines the hood 10 as described above.

Figure 7A:
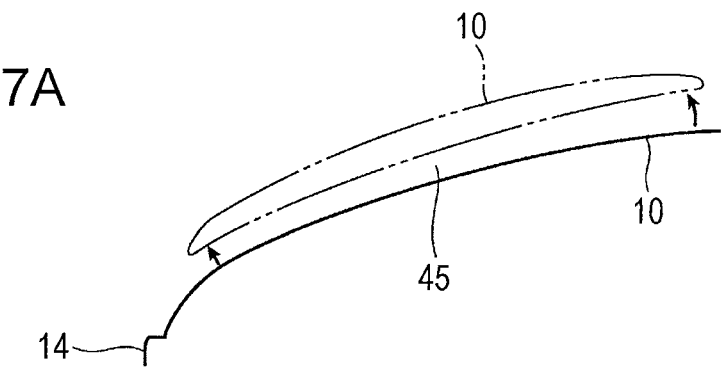
FIGS. 7A to 7C are explanatory diagrams for describing a movement direction of the hood to be moved by the vehicle hood moving device.

Also, as soon as or after the controller 50 receives an electric signal corresponding to the collision load from the collision detecting sensor 41, or receives a detection signal to the effect that there is a danger that a pedestrian will collide with the vehicle from the collision predicting unit 42, and moves the rear side of the hood 10 upward to incline the hood 10 to the front side, as illustrated in FIG. 7A, electric power may be supplied to the coils 28 of the second magnet left-side 22Lf and second magnet right-front 22Rf so that the front side of the hood 10 moves upward. Thus, space 45 to absorb shock at the time of a pedestrian falling onto the hood 10 can be formed downward of the hood 10.

Figure 7B:
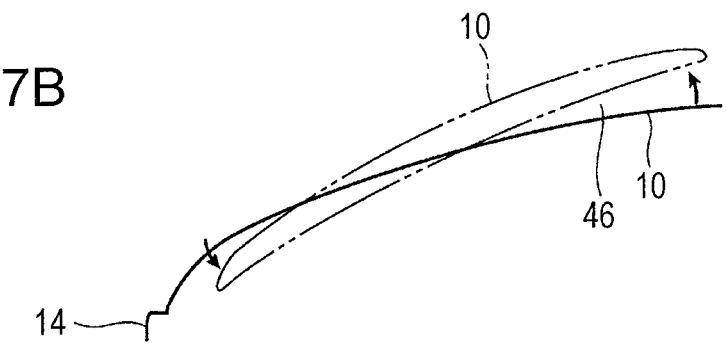

Also, as soon as or after the controller 50 receives an electric signal corresponding to the collision load from the collision detecting sensor 41, or receives a detection signal to the effect that there is a danger that a pedestrian will collide with the vehicle from the collision predicting unit 42, and moves the rear side of the hood 10 upward to incline the hood 10 to the front side, as illustrated in FIG. 7B, power supply to the coils 28 of the second magnet left-side 22Lf and second magnet right-side 22Rf may be blocked or reverse current may be applied thereto so that the front side of the hood 10 moves downward. Thus, much more space 46 to absorb shock to the hood 10 at the time of a pedestrian moving to the front glass 7 side can be secured.

Figure 7C:
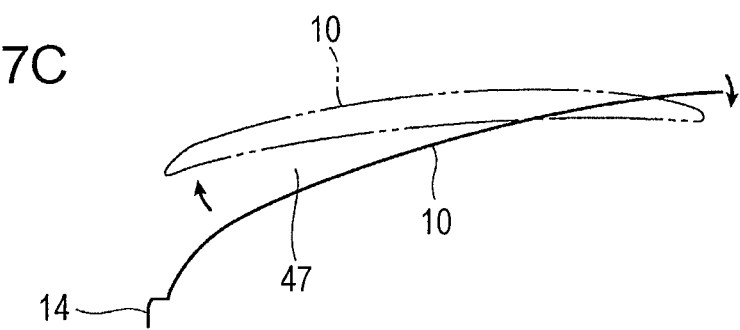

Further, as soon as or after the controller 50 receives an electric signal corresponding to the collision load from the collision detecting sensor 41, or receives a detection signal to the effect that there is a danger that a pedestrian will collide with the vehicle from the collision predicting unit 42, and moves the rear side of the hood 10 upward to incline the hood 10 to the front side, as illustrated in FIG. 7C, power supply to the coils 26, 27, and 28 of the second magnet left-front 22Lf, second magnet right-front 22Rf, second magnet left-rear 22Lb, and second magnet right-rear 22Rb may be controlled so that the front side of the hood 10 moves upward, and also the rear side of the hood 10 moves downward. Thus, space 47 to absorb shock at the time of a pedestrian falling onto the hood 10 can be formed, and also a danger that the pedestrian will fall onto the road surface from above the hood 10 can be reduced.

Note that the controller 50 controls power supply to the second magnet left-center 22Ls and second magnet right-center 22Rs according to inclination of the hood 10.

Figure 8:
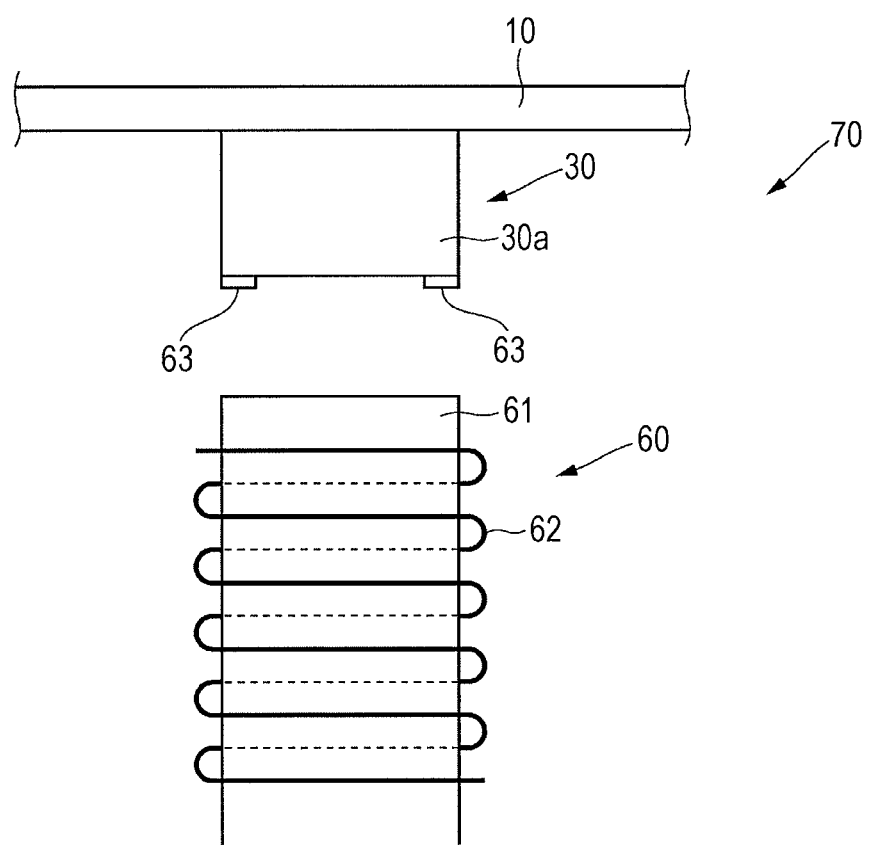
FIG. 8 is a configuration diagram of a hood moving device configured to move a hood according to another embodiment of the present invention.

With the hood moving device 20 according to the above-mentioned embodiment, the second magnet 22a is configured of the cylindrical iron core 23 being wound with the coil 26, and the first magnet 30 is configured so as to be inserted into the hole portion 23a of the iron core 23, but with the hood moving device 70, as illustrated in FIG. 8, an arrangement may be made in which a second magnet 60 serves as a cylindrical iron core 61, this iron core 61 is wound with a coil 62, and is disposed so as to face the iron core 30a of the first magnet 30. In this case, length in the vertical direction of the iron core 30a of the first magnet 30 is shortened as compared to the above-mentioned case of the iron core 30a (see FIG. 4). The controller 50 controls the magnitude of current to be supplied to the coil 62 of the second magnet 60, whereby the vertical position of the first magnet 30 as to the second magnet 60 can be adjusted. Note that this configuration is simpler than the above-mentioned embodiment, whereby cost can be reduced to inexpensive cost. Also, a buffer material 63 for relieving collision with the second magnet 60 may be provided to the lower edge of the first magnet 30. This buffer material may be provided on the second magnet side.

Figure 9:
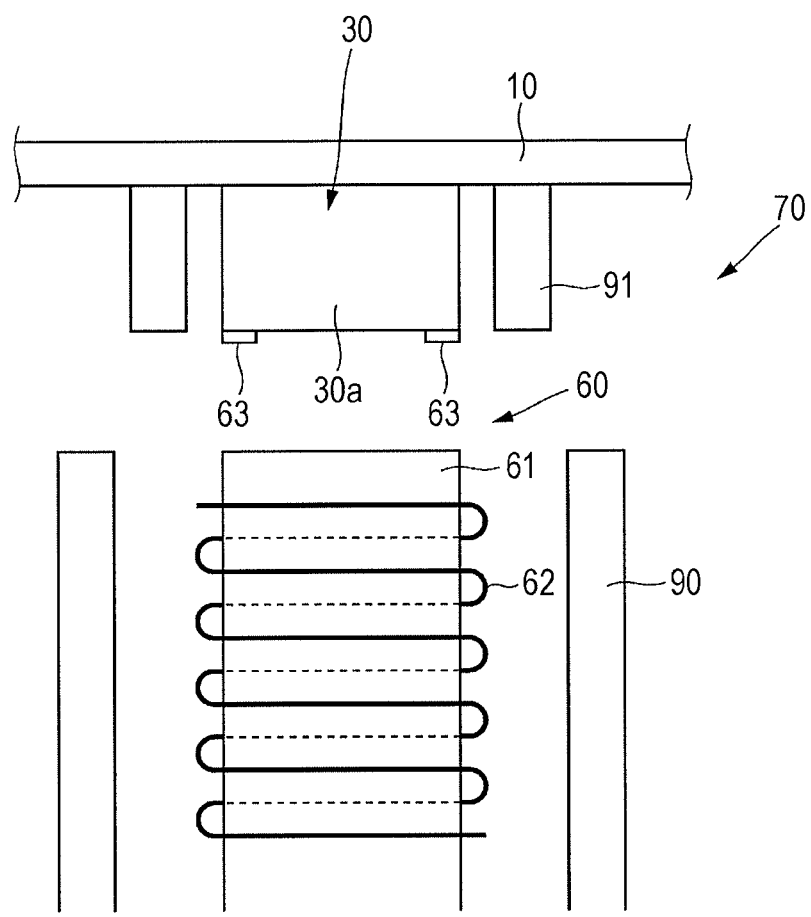
FIG. 9 is a configuration diagram of a hood moving device configured to move a hood according to another embodiment of the present invention.

Also, with the hood moving device 70, as illustrated in FIG. 9, around each of the first magnets 30 and second magnets 22, electromagnetic shields 91 and 90 (electromagnetic field suppressing members) covering these magnets may be disposed. The electromagnetic shields 91 and 90 (electromagnetic field suppressing members) are members to reflect, shield, or weaken the electromagnetic field. Examples of the electromagnetic field suppressing members include a member having electro-conductivity, electro-conductive synthetic resin, carbon fiber union cloth, carbon being dispersed in urethane foam, foam metal, iron plate, copper plate, aluminum plate, metal mesh plate, electro-conductive coating material, and plating. The thicknesses of these, and the size of a mesh hole can be changed according to wavelength of electromagnetic waves to be shielded.

Thus, absorption of iron sand, dust, or the like drawn by magnetic force of the first magnet 30 made up of a permanent magnet can be prevented, and operability can be improved. Also, generation of sound due to absorption of iron sand, dust, or the like can also be prevented.

Figure 10:
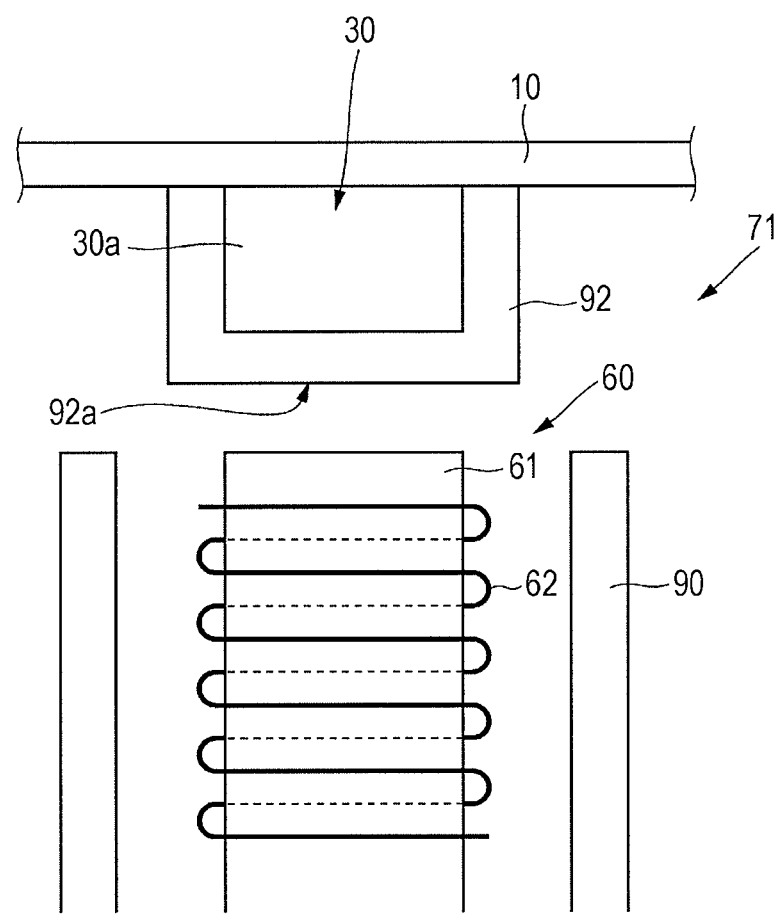
FIG. 10 is a configuration diagram of a hood moving device configured to move a hood according to another embodiment of the present invention.

With the hood moving device 70 according to the above-mentioned embodiment, there has been made an arrangement in which the circumference of the first magnet 30 is covered with the electromagnetic shield 91, and the buffer material 63 for relieving collision with the second magnet 60 is provided to the lower edge of the first magnet 30, but as illustrated in FIG. 10, there may be employed a hood moving device 71 in which the electromagnetic shield 92, covering not only the circumference of the first magnet 30 but also a surface facing the second magnet 60, is disposed.

In this case, iron sand or dust drawn by magnetic force from the opposing face as to the second magnet 60 of the first magnet 30 can be prevented. Here, a member used for this opposing face 92a may also be a member having a function serving as a buffer material. Examples of this include a synthetic resin, plastic, or gel into which a material having electro-conductivity is kneaded. Also, the member of the opposing face is preferably a material which shields magnetic force from the opposing face of the first magnet 30, and also passes magnetic field lines from the second magnet 60. Also, the electromagnetic shield 92 may be a member which differs between the opposing face and the peripheral portion. Examples of a preferable material include a material with the peripheral portion being made up of a member to completely shield the electromagnetic field, and the opposing face being made up of a member to weaken the electromagnetic field or a member to shield magnetic force from the opposing face of the first magnet 30 and also to pass the magnetic filed lines from the second magnet 60.

Figure 11:
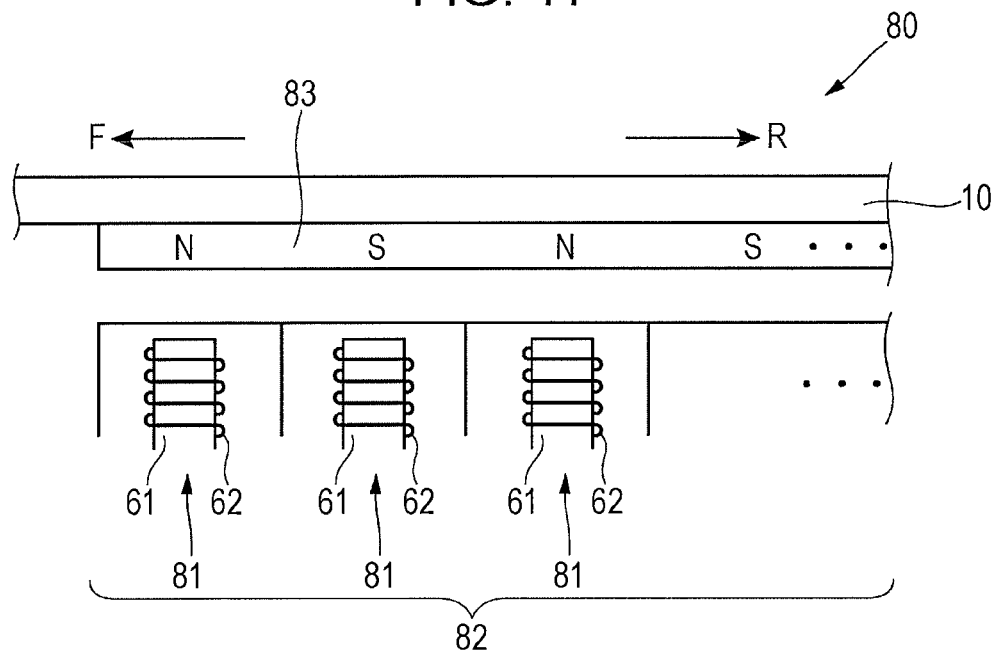
FIG. 11 is a configuration diagram of a hood moving device configured to move a hood according to another embodiment of the present invention.

Also, with the hood moving device 80, as illustrated in FIG. 11, an arrangement may be made in which a second magnet group 82 is configured of multiple second magnets 81 making up an electromagnet by the cylindrical iron core 61 being wound with the coil 62 being linearly arrayed in the front/back direction or vehicle-width direction, a first magnet 83 is provided to the rear face of the hood 10 so as to face above the multiple arrayed second magnets 81, and a linear motor is made up of the first magnet 83 and second magnet group 82. In this case, the first magnet 83 is configured so that the magnetic pole is positioned in the facing second magnet 81 side. With the present embodiment, the N pole, S pole, N pole, and so on are disposed toward the rear side from the vehicle front side.

Figure 12:
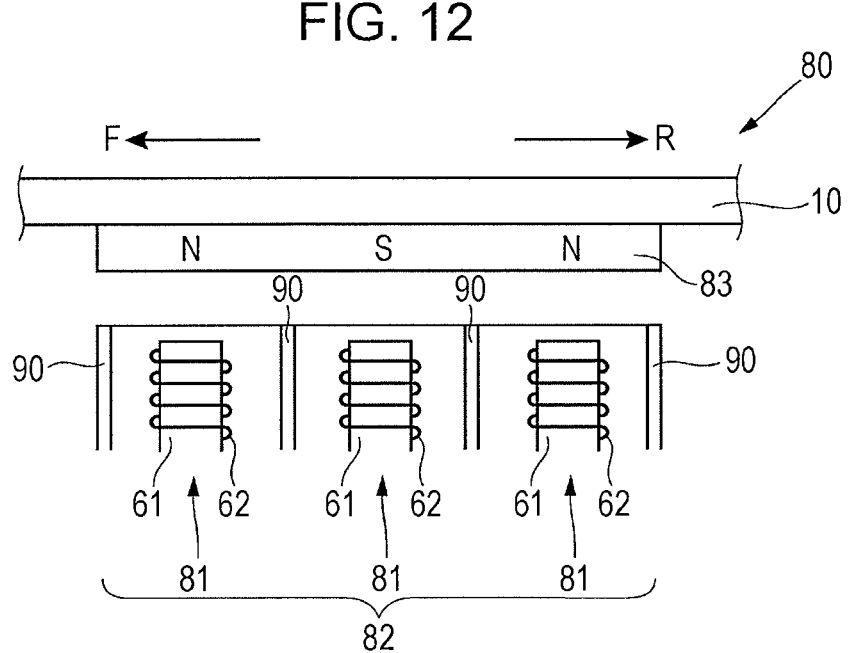
FIG. 12 is a configuration diagram of a hood moving device configured to move a hood according to another embodiment of the present invention.

Also, with the hood moving device 80, as illustrated in FIG. 12, an arrangement may be made in which the second magnet group 82 is configured of multiple second magnets 81 making up an electromagnet by the cylindrical iron core 61 being wound with the coil 62 being linearly arrayed in the front/back direction, the first magnet 83 is provided to the rear face of the hood 10 so as to face above the multiple arrayed second magnets 81, and a linear motor is made up of the first magnet 83 and second magnet group 82. Each of the second magnets 81 is covered with the electromagnetic shield 90, and a portion facing the first magnet 83 is covered with a member which does not shield nor reflect the magnetic field. In this case, the first magnet 83 is configured so that the magnetic pole is positioned on the facing second magnet 81 side. With the present embodiment, the N pole, S pole, and N pole are disposed toward the rear side from the vehicle front side. Note that the electromagnetic shield 92 as illustrated in FIG. 10 may also be disposed as to the first magnet 83.

Figure 13:
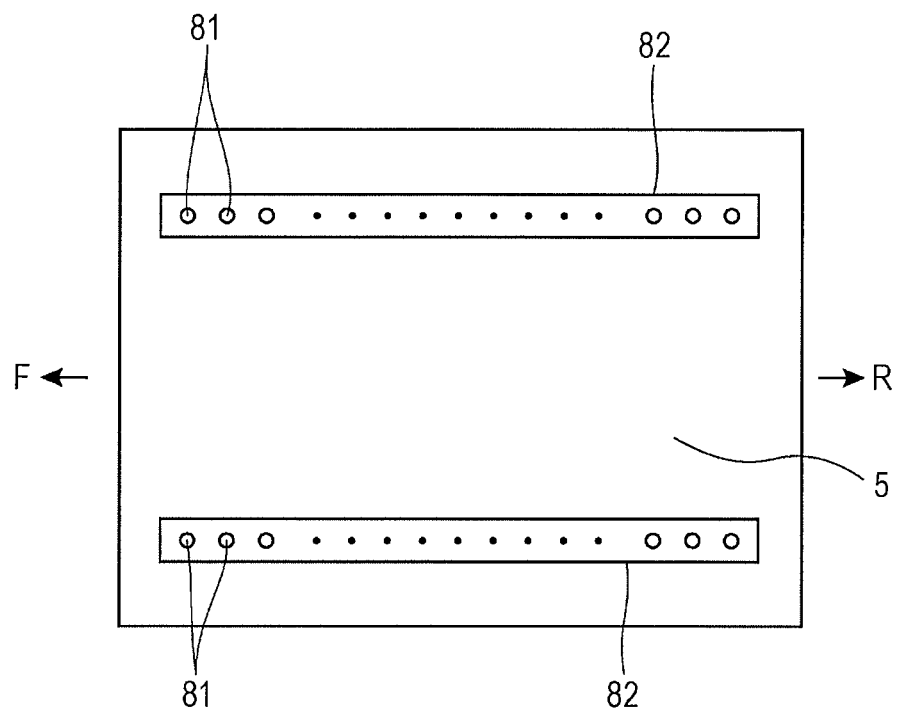
FIG. 13 is an explanatory diagram for describing a layout of a hood moving device according to another embodiment of the present invention.
Figure 14:
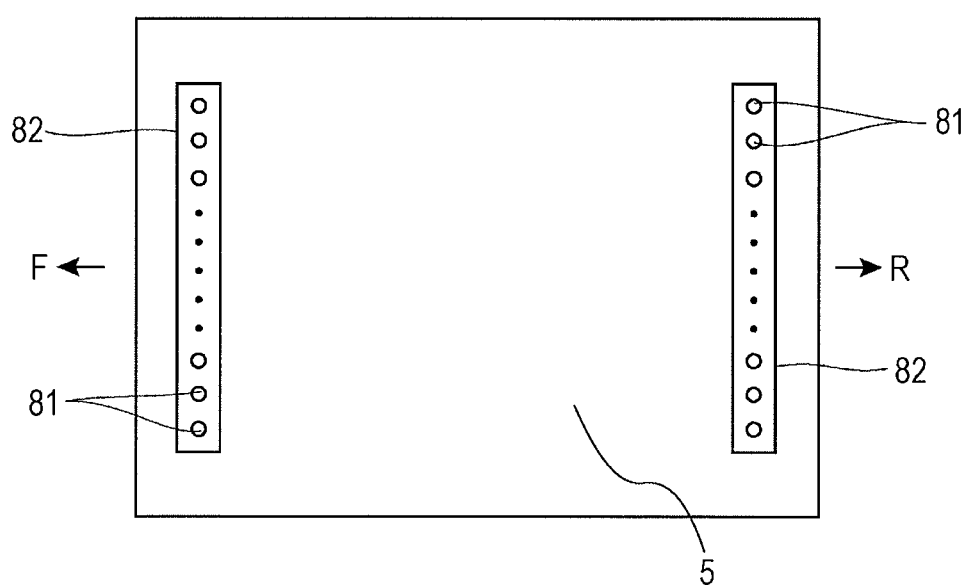
FIG. 14 is an explanatory diagram for describing another layout of a hood moving device according to another embodiment of the present invention.

The second magnet group 82 is, as illustrated in FIG. 13, installed on both edges in the vehicle-width direction of the engine room 5 so as to extend in the front/back direction. The second magnet group 82 is thus disposed, and switching of excitation is controlled so that the magnetic poles of the iron cores on the hood side of the second magnets 81 become the N pole or S pole, whereby the hood 10 can be moved in the front/back direction by force to tug between the N pole and S pole of the second magnets 81 and first magnet 83, and repelling force between the N poles/between the S poles. Note that the first magnets 81 may be provided to the front side and rear side of the hood 10 so as to extend in the hood-width direction, and the second magnet group 82 may be provided to the front side and the rear side of the engine room 5 so as to face the first magnets 81 as illustrated in FIG. 14. Switching of excitation is controlled so that the magnetic poles of the iron cores on the hood side of the second magnets 81 become the N pole or S pole in this way, whereby the hood 10 can be moved in the vehicle-width direction by force to tug between the N pole and S pole of the second magnets 81 and first magnet 83, and repelling force between the N poles/between the S poles.

In this way, the moving devices 21 of the hood moving devices 20, 70, and 80 are made up of the first magnet and second magnet, and the multiple moving devices 21 are disposed around the engine room. Therefore, the size of each magnet can be reduced, and the moving devices 21 can be installed in the engine room 5 while conserving space. Also, the first magnet is moved by supply control of electric power to the second magnet, and accordingly, responsiveness as to movement of the hood 10 can be improved.

Note that, with the above-mentioned embodiment, though the second magnet is configured of an electromagnet, but the second magnet may be configured of a permanent magnet. In this case, there has to be provided a device in which a plate member (e.g., electro-conductive plate) to shield the magnetic filed is inserted between the first magnets 30 and second magnets 22 beforehand, and the plate member is removed when a pedestrian collides with the vehicle or has a danger of colliding with the vehicle.

Also, with the above-mentioned embodiment, the hood 10 is supported by the hood hinges 11 and hood lock device 17, but the hood hinges 11 and hood lock striker may be attached to the body 3 or hood 10 via a fracture bolt which is fractured when shearing force equal to or greater than predetermined force is applied to the fracture bolt. Thus, when a pedestrian collides with the vehicle, the fracture bolt is fractured, and the hood 10 thus is in a non-connected state as to the body 3, and the hood 10 can be moved by the hood moving devices 20, 70, and 80.

Figure 15:
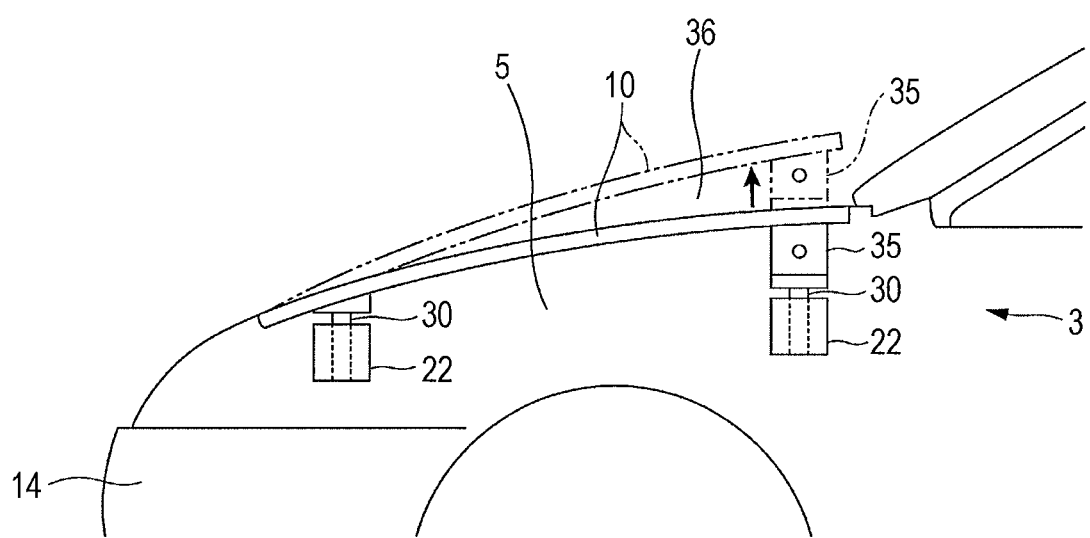
FIG. 15 is a configuration diagram of a hood moving device according to another embodiment of the present invention.

Also, as illustrated in FIG. 15, an arrangement may be made in which a hinge mechanism 35 is provided to the rear side of the hood 10, the first magnet 30 is provided to bottom of this hinge mechanism 35, and the second magnet 22 is provided in the engine room 5 facing this first magnet 30. Thus, when supplying electric power to the second magnet 22 and moving the first magnet 30 upward, the front side of the hood 10 is fixed, and accordingly, the rear side of the hood 10 can be moved to the upper side in the circumference direction with this fixed front side of the hood 10 as a supporting point. Therefore, a space portion 36 is formed downward of the hood 10, modification of the hood 10 is facilitated, whereby a pedestrian's shock can be absorbed in a sure manner.

Also, with above-mentioned embodiment, though there has been illustrated a case where the hood 10 is moved by the hood moving device 20, an object to be moved may be the side doors, hatch, or roof of the vehicle.

Next, a preferred embodiment of a pedestrian protection apparatus for a vehicle according to the present invention will be described based on FIGS. 16 to 21. First, the front side of a vehicle where the pedestrian protection apparatus for a vehicle is provided will briefly be described with reference to FIGS. 16, 17, and 18. Note that, with the present embodiment, an automobile will be described as an example of a vehicle.

Figure 16:
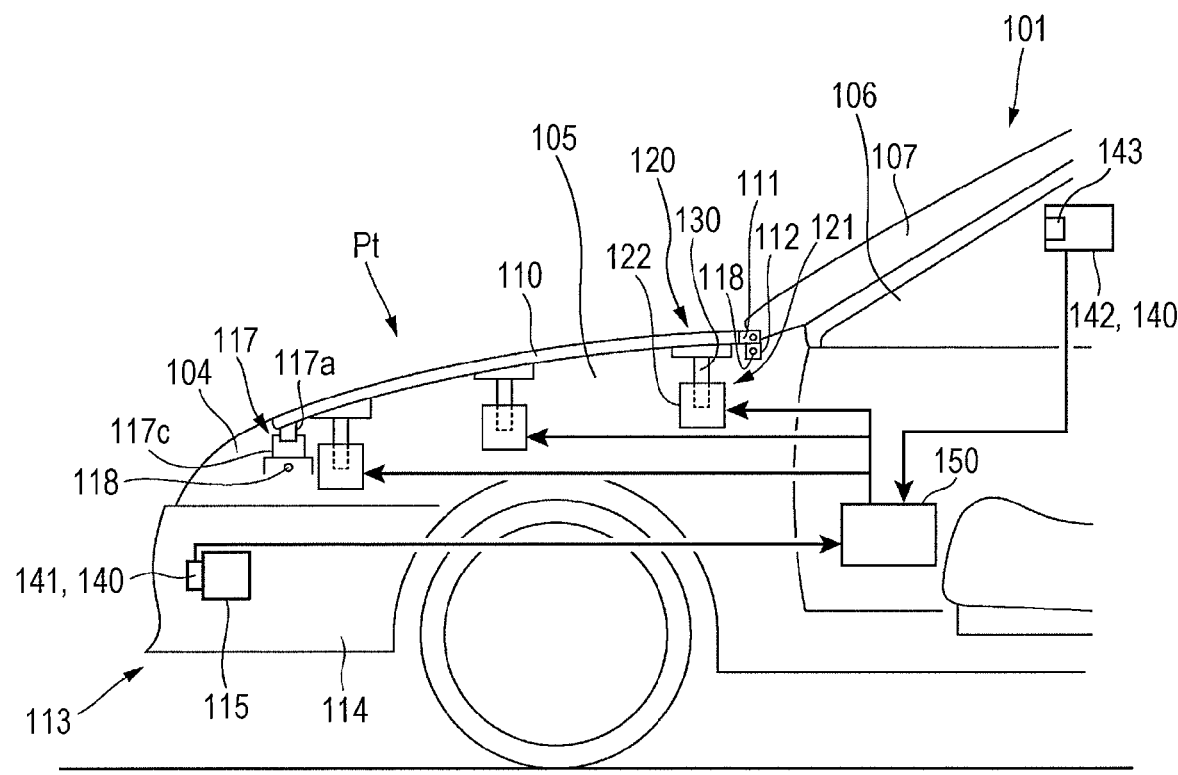
FIG. 16 is an explanatory diagram for describing a side face side of the front side of an automobile where a pedestrian protection apparatus for a vehicle according to an embodiment of the present invention is provided.
Figure 17:
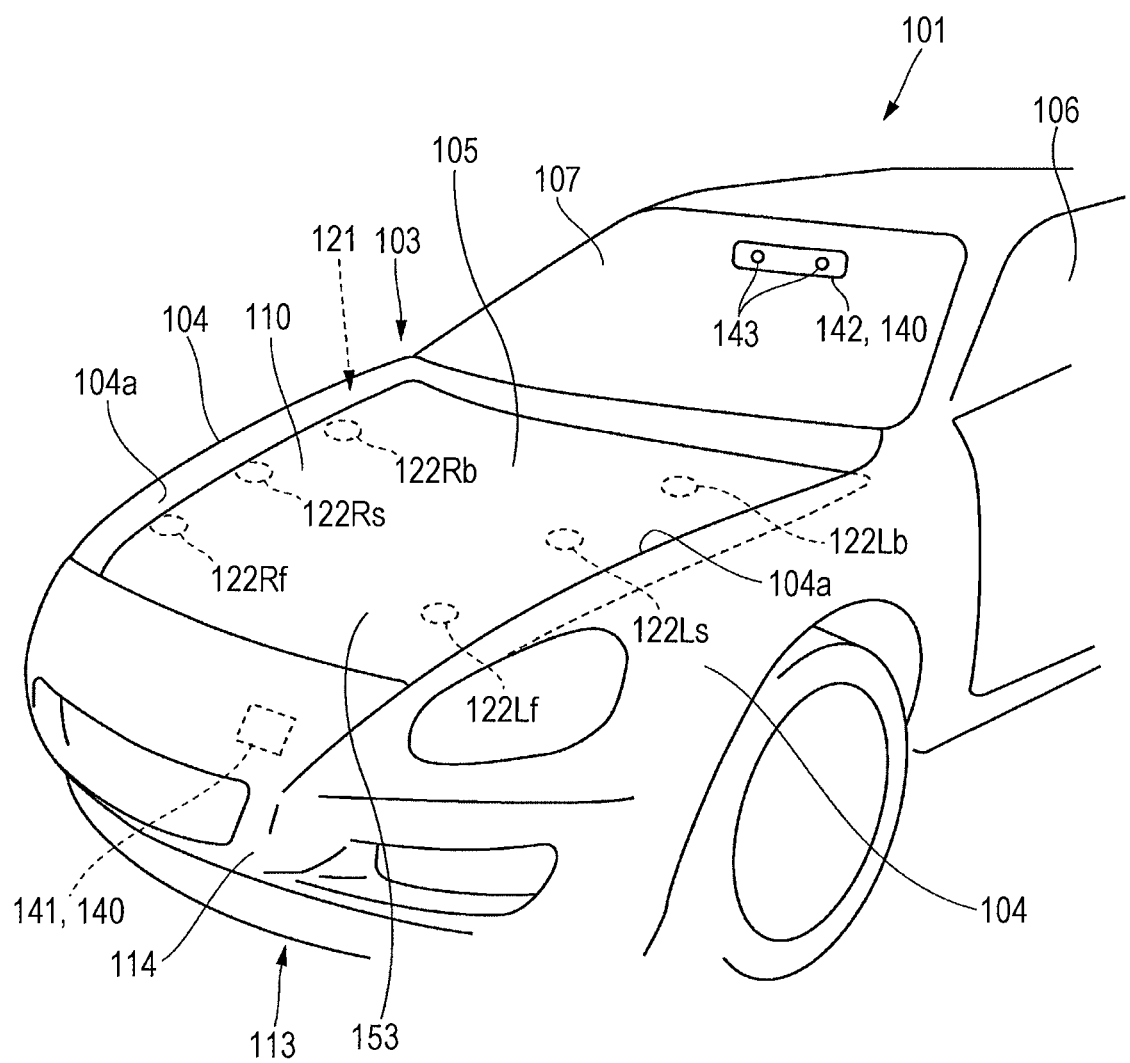
FIG. 17 is a perspective view of the front side of the automobile where the pedestrian protection apparatus for a vehicle according to an embodiment of the present invention is provided.
Figure 18:
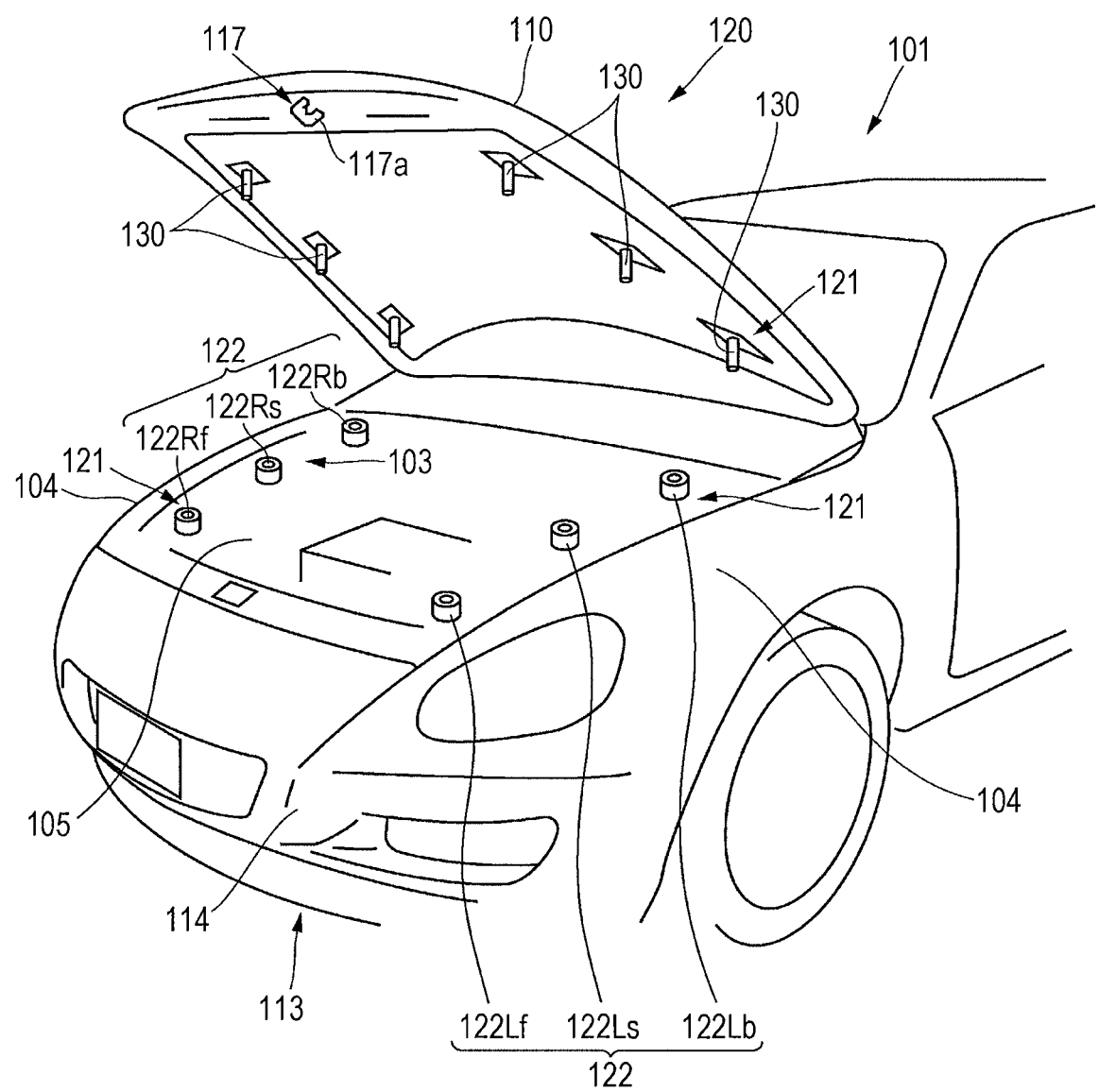
FIG. 18 is a perspective view of the front side of the automobile in a state in which the hood is opened.

With the front side of the body 103 of an automobile 101, as illustrated in FIGS. 16, 17, and 18, a pair of front fenders 104 disposed on both sides in the vehicle-width direction extending in the front/back direction are disposed, and an engine room 105 is provided between this pair of front fenders 104. The upper portion of this engine room 105 is covered with a hood 110. A front bumper 113 is disposed in the front edge of the body 103, and the front bumper 113 includes a bumper face 114, and a bumper beam 115 (see FIG. 16) disposed in the inner side thereof extending in the vehicle-width direction. The bumper beam 115 is fixed to a body frame which is not illustrated, of which the shape and intensity have been designed to rebound in a direction where the shape is restored by elasticity at the time of collision of a collision object of interest (pedestrian).

The hood 110 is supported at the body 103 with opening-free/closing-free via a pair of hood hinges 111 provided to both sides in the vehicle-width direction of the rear edge thereof. With the hood hinges 111, the tip sides thereof are connected to the rear face of the hood 110, and the rear edge sides are turnably connected to a seating 112 provided to the body 103. The front edge of the hood 110 is locked to the body side by a hood lock device 117. The hood lock device 117 includes a lock striker 117a provided to the hood side, and a latch 117c which is turnably provided to the body side and can lock/unlock the lock striker 117a.

The seating 112 and latch 117c are connected to the body 103 via a fracture bolt 118. This fracture bolt 118 is formed so as to be fractured when the first magnet 130 is pulled upward as will be described later. Accordingly, the hood 110 thus is in a non-connected state as to the body 103, whereby the hood 110 can be moved downward independently of a supporting mechanism thereof. Note that, though FIG. 18 illustrates, for convenience of description, a state in which the front side of the hood 110 is opened upward with this rear edge side as a supporting point, at the time of driving, the hood 110 as illustrated in FIG. 17 is in a state covering the engine room 105, and is held by the hood hinges 111 and hood lock device 117.

Next, the overall configuration of the pedestrian protection apparatus for a vehicle will be described with reference to FIGS. 16 to 21. The pedestrian protection apparatus for a vehicle 120 is, as illustrated in FIG. 16, configured of the hood 110 held in the inner side of the pair of front fenders 104, a moving device 121 which holds the hood 110 with movement-free, a pedestrian collision detecting device 140 configured to detect whether a pedestrian has collided with the automobile 101 or has a danger of colliding with the automobile 101, and a controller 150 configured to move the hood 110 as to the body 103 using the moving device 121 when detection is made by the pedestrian collision detecting device 140 that a pedestrian has collided with the automobile 101 or has a danger of colliding with the automobile 101.

The hood 110 is, as illustrated in FIG. 17, formed in a generally rectangular shape at a plane view so as to cover above the engine room 105. Note that FIG. 17 illustrates a state in which the hood 110 is moved to the body inner side (downward) by the moving device 121.

The moving device 121 includes, as illustrated in FIGS. 17 and 18, multiple first magnets 130 disposed on both sides of the vehicle-width direction of the rear face of the hood 110 with a predetermined interval in the front/back direction, and multiple second magnets 122 disposed on both sides of the vehicle-width direction of the engine room 105 with a predetermined interval in the front/back direction. The first magnets 130 and second magnets 122 are disposed so as to face each other in a state in which the hood 110 covers the engine room 105. The first magnets 130 are permanent magnets, and the second magnets 122 are electromagnets.

Figure 19:
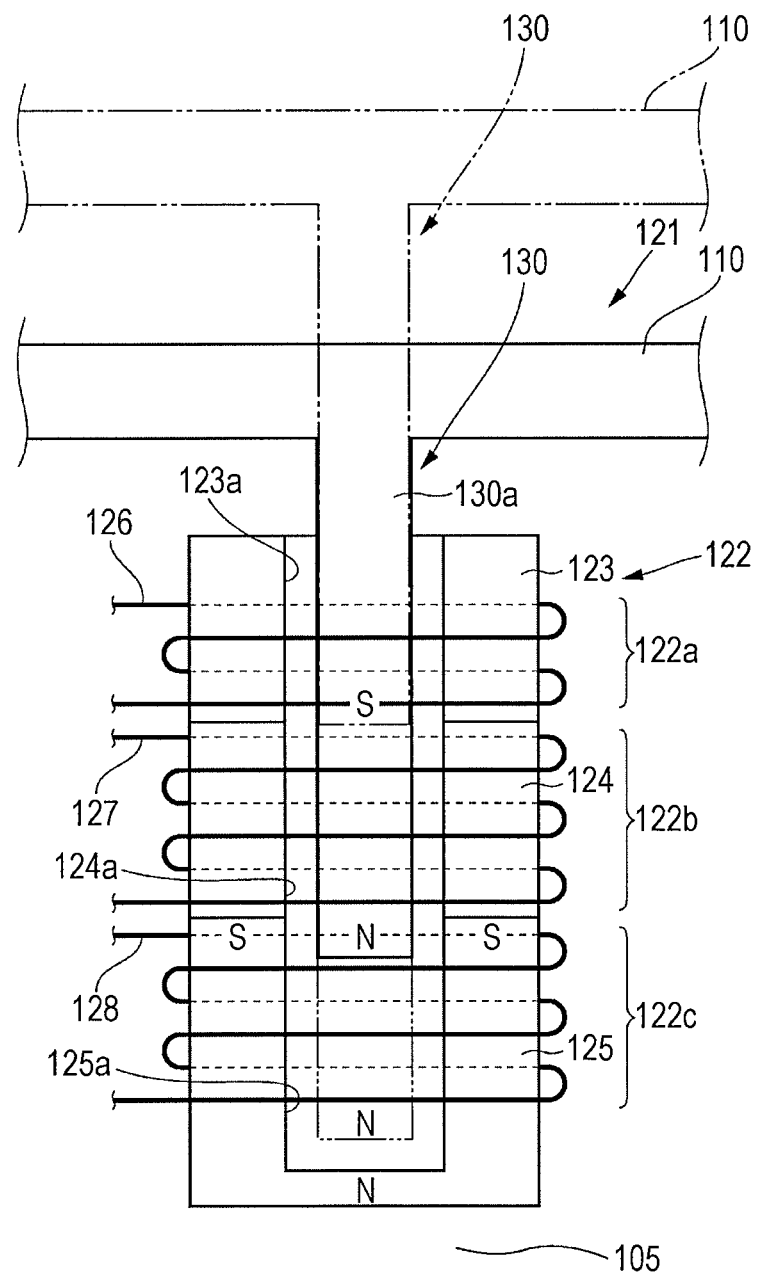
FIG. 19 is a configuration diagram of a moving device which moves the hood.

The configurations of the first magnets 130 and second magnets 122 will be described with reference to FIG. 19. First, the second magnets 122 will be described. The second magnets 122 include, as illustrated in FIG. 19, cylindrical iron cores 123, 124, and 125 formed so as to continue three steps from upward to downward, and coils 126, 127, and 128 wound around these iron cores 123, 124, and 125 respectively, and these iron cores 123, 124, and 125 are installed in the engine room 105 so that hole portions 123a, 124a, and 125a within the iron cores continuously extend in the vertical direction. Note that, for convenience of description, of three steps, the second magnet 122 disposed in the uppermost portion will be referred to as a second magnet 122a, the second magnet 122 disposed in the intermediate portion in the vertical direction will be referred to as a second magnet 122b, and the second magnet 122 disposed in the lowermost portion will be referred to as a second magnet 122c. The coils 126, 127, and 128 are electrically connected to a controller (see FIG. 16), to which electric power is supplied, or power supply is blocked. In the event of electric power being supplied to the coils 126, 127, and 128 of the second magnet 122, the lower edges of the corresponding iron cores 123, 124, and 125 become the N pole, and the upper edges thereof become the S pole. Also, when changing the current direction of electric power to be supplied, the lower edges of the corresponding iron cores 123, 124, and 125 become the S pole, and the upper edges thereof become the N pole.

The first magnets 130 are permanent magnets where an iron core 130a extends in a rod shape, and are extractably inserted into the hole portions 123a, 124a, and 125a of the second magnets 122a, 122b, and 122c. The bottom of the iron core 130a is excited to the N pole, and the intermediate portion of the iron core 130a is excited to the S pole. Distance between the S pole and N pole of the first magnets 130 is infinitely longer than length in the vertical direction of each of the second magnets 122a, 122b, and 122c. Therefore, in a state in which the iron cores 130a of the first magnets 130 are inserted into the hole portions 123a, 124a, and 125a of the second magnets 122a, 122b, and 122c, when electric power is supplied to a coil 128 disposed at the bottom portion of the second magnet 122c, repelling force occurs between the N pole of the second magnet 122c and the N pole of the first magnet 130, repelling force occurs between the S pole of the second magnet 122c and the S pole of the first magnet 130, and the first magnet 130 is pulled up and moved into the second magnet 122b.

Also, in a state in which electric power is supplied to the second magnet 122c, when electric power is supplied to the coil 127 of the second magnet 122b, the bottom of the iron core 124 of the second magnet 122b is excited to the N pole, and the top of the iron core 124 is excited to the S pole. In this state, when power supply to the second magnet 122c is blocked, the second magnet 122c thus is in a non-excited state, the first magnet 130 is further pulled up and moved into the second magnet 122a as illustrated in a dashed two-dotted line by magnetic force (repelling force) between the N pole of the second magnet 122b and the N pole of the first magnet 130, and magnetic force (repelling force) between the S pole of the second magnet 122b and the S pole of the first magnet 130.

On the other hand, in a state in which the first magnets 130 is pulled up, when supplying electric power to the second magnet 122b so that current in the opposite direction of the above-mentioned case flows into the second magnet 122b, the lower side of the second magnet 122b is excited to the S pole, and the upper side is excited to the N pole. Therefore, according to magnetic force (attraction force) between the S pole of the second magnet 122b and the N pole of the first magnet 130, magnetic force (attraction force) between the N pole of the second magnet 122b and the S pole of the first magnet 130, and the gravity of the hood 110, the first magnet 130 moves downward, and moves into the second magnet 122b. Similarly, in a state in which the second magnet 122b is excited, when supplying electric power to the second magnet 122c so that current in the opposite direction of the above-mentioned case flows into the second magnet 122c, the iron core 130a of the first magnet 130 moves downward, and the first magnet 130 moves into the second magnet 122c.

That is to say, power supply to the coils 127 and 128 of the second magnets 122b and 122c is controlled, whereby the vertical position of the first magnet 130 can be adjusted. Therefore, power supply to the second magnet 122 is controlled, whereby the first magnet 130 can be moved in a direction separated from/closer to the second magnet 122. Accordingly, the entirety of the hood 110 can be moved downward by movement of the first magnet 130 as will be described later.

Note that the hood 110 usually covers, as illustrated in FIG. 16, above the engine room 105, but disposed in a position along the outer surface of the front fender 104 (hereafter, referred to as "normal position Pt") so as to suppress occurrence of steps between the upper portions of the pair of the front fenders 104. Displacement of the hood 110 to this normal position Pt is performed by the hood hinges 111 and hood lock device 117 holding the hood 110.

Also, for convenience of description, as illustrated in FIG. 18, the second magnet 122 disposed in the front portion on the left side in the vehicle-width direction of the engine room 105 will be referred to as second magnet left-front 122Lf, the second magnet 122 disposed in the intermediate portion in the front/back direction on the left side in the vehicle-width direction of the engine room 105 will be referred to as second magnet left-center 122Ls, and the second magnet 122 disposed in the rear portion on the left side in the vehicle-width direction of the engine room 105 will be referred to as second magnet left-rear 122Lb. Also, the second magnet 122 disposed in the front portion on the right side in the vehicle-width direction of the engine room 105 will be referred to as second magnet right-front 122Rf, the second magnet 122 disposed in the intermediate portion in the front/back direction on the right side in the vehicle-width direction of the engine room 105 will be referred to as second magnet right-center 122Rs, and the second magnet 122 disposed in the rear portion on the right side in the vehicle-width direction of the engine room 105 will be referred to as second magnet right-rear 122Rb.

Next, the collision detecting sensor and collision predicting device will be described with reference to FIG. 16. The collision detecting sensor 141 is, as illustrated in FIG. 16, attached to the front face of the bumper beam 115 and outputs an electric signal according to the magnitude of collision load. The collision predicting device 142 includes a camera 143 disposed in the center portion in the vehicle-width direction on the rear face of the front glass 107 within the vehicle room 106, and is configured to predict whether or not a pedestrian has a danger of colliding with the automobile 101, from an imaged image in front of the vehicle taken by this camera 143, and to output this.

Figure 21A:
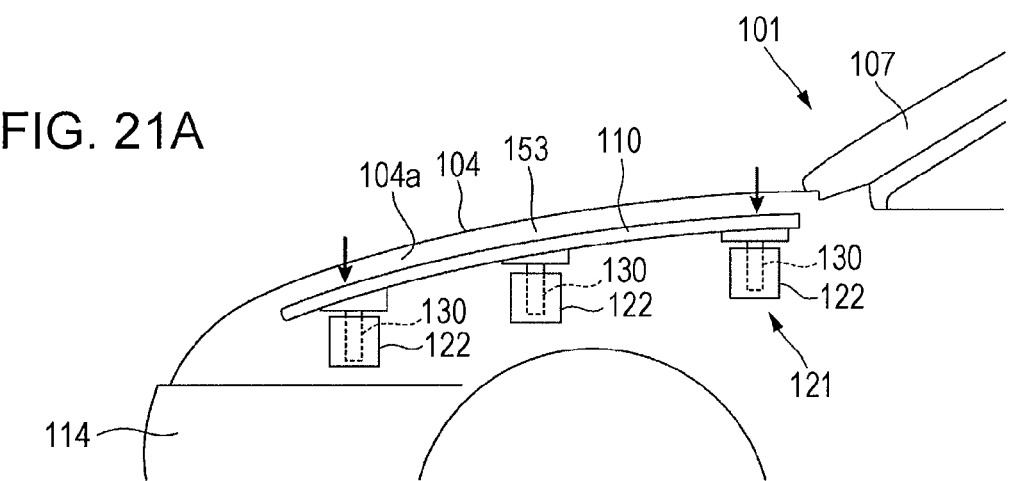
FIGS. 21A to 21C are explanatory diagrams of operation of a pedestrian protection apparatus for a vehicle according to an embodiment of the present invention.

Next, the controller 150 will be described with reference to FIGS. 17, 20, and 21. As illustrated in FIGS. 17, 20, and 21A, the controller 150 supplies electric power to the second magnet 122 according to a detection signal from the collision detecting sensor 141 and collision predicting device 142, or blocks power supply thereto. Specifically, in the event of having received an electric signal corresponding to collision load from the collision detecting sensor 141, or an electric signal regarding a pedestrian having a danger of colliding with the automobile 101, from the collision predicting device 142, the controller 150 determines whether or not this electric signal corresponds to collision load at the time of collision or whether or not this electric signal corresponds to that a pedestrian has a danger of colliding with the automobile 101, and in the event that this electric signal corresponds to collision load at the time of collision or that a pedestrian has a danger of colliding with the automobile 101, the controller 150 controls the direction of current to flow into the second magnets (second magnet left-front 122Lf, second magnet left-center 122Ls, second magnet left-rear 122Lb, second magnet right-front 122Rf, second magnet right-center 122Rs, and second magnet right-rear 122Rb) so that the first magnets 130 actively move downward as to the second magnets 122 (move into the second magnets 122c).

Accordingly, the fracture bolt 118 is fractured by shock load at the time of collision, or the fracture bolt 118 is fractured according to movement to downward of the hood 110 at the time of having a danger of colliding with the automobile 101, whereby the hood 110 can move downward independently of these supporting mechanisms. Accordingly, the hood 110 actively moves in the vehicle-inner-side direction (downward) from the normal position Pt. Therefore, a recessed portion 153 is formed in a region surrounded with the top face of the hood 110 and the inner face of the pair of front fenders 104, and a step 104a occurs in the inner side of the front fenders 104 (see FIGS. 17 and 21A). Therefore, in the event that a pedestrian has collided with the automobile 101 and fallen onto the hood 110, the pedestrian's movement is restricted by the inner faces of the front fenders 104 which become the step 104a, and falling to the road surface side is prevented.

Figure 21B:
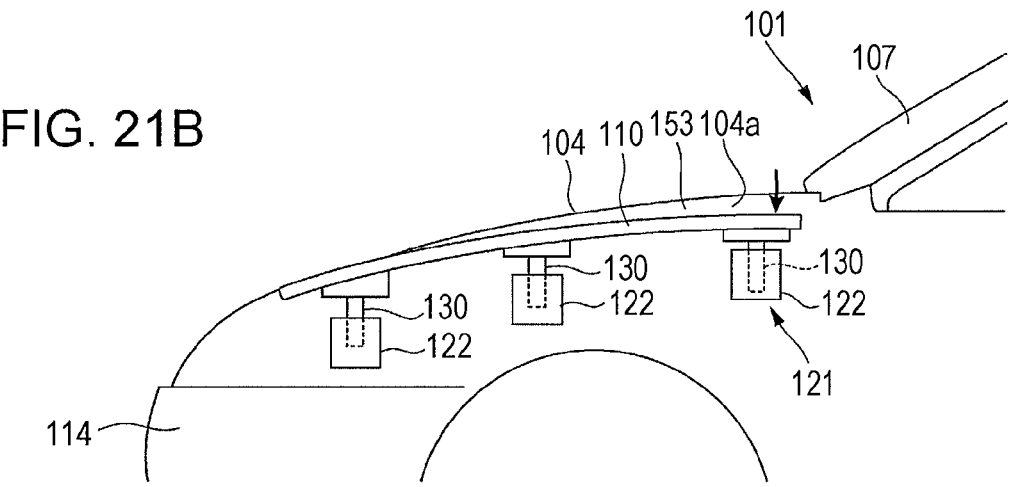
Figure 21C:
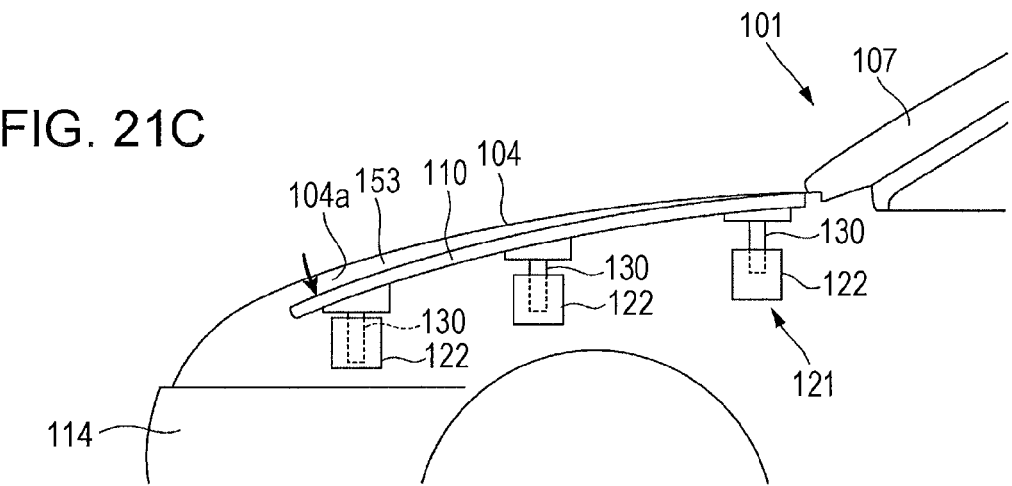

Note that, with the above-mentioned embodiment, though there has been illustrated a case where at the time of operation of the moving device 121, the entirety of the hood 110 moves downward, an arrangement may be made, as illustrated in FIG. 21B, in which the entirety of the rear side of the hood 110 moves downward and a step 104a is formed on the rear sides of the front fenders 104. In this case, the second magnets 122 are controlled so that the protruding amount of the first magnets 130 protruding from the second magnets becomes smaller the further toward the rear of the vehicle. Also, as illustrated in FIG. 21C, an arrangement may be made in which the entirety of the front side of the hood 110 moves downward, and the step 104a is formed on the front sides of the front fenders 104. In this case, the second magnets 122 are controlled so that the protruding amount of the first magnets 130 protruding from the second magnets becomes smaller the further toward the front of the vehicle. Also, at the time of operation of the moving device 121, the left side in the vehicle-width direction of the hood 110 may further move downward as the entire hood 110 moves downward, or only the left side in the vehicle-width direction of the hood 110 may move downward.

Also, with the above-mentioned embodiment, though the first magnet 130 made up of a permanent magnet has been attached to the hood 110 side, and the second magnets 122 which are electromagnets have been provided to the engine room 105 side, an arrangement may be made in which these are inversely provided, the first magnet 130 made up of a permanent magnet is provided to the engine room 105 side, and the second magnets 122 which are electromagnets are provided to the hood 110 side. Also, with the above-mentioned embodiment, though there has been illustrated a case where the hood 110 is moved by the pedestrian protection device 120 for a vehicle, the side doors, hatch, or roof of the vehicle may be made to be moved.

Hereafter, another embodiment of preferred embodiments of the pedestrian protection apparatus for a vehicle according to the present invention will be described based on FIGS. 22 to 28. First, overview will be described regarding the front side of the vehicle where the pedestrian protection apparatus for a vehicle is provided, with reference to FIGS. 22, 23, and 24. Note that, with the present embodiment, an automobile will be described as a vehicle example.

Figure 22:
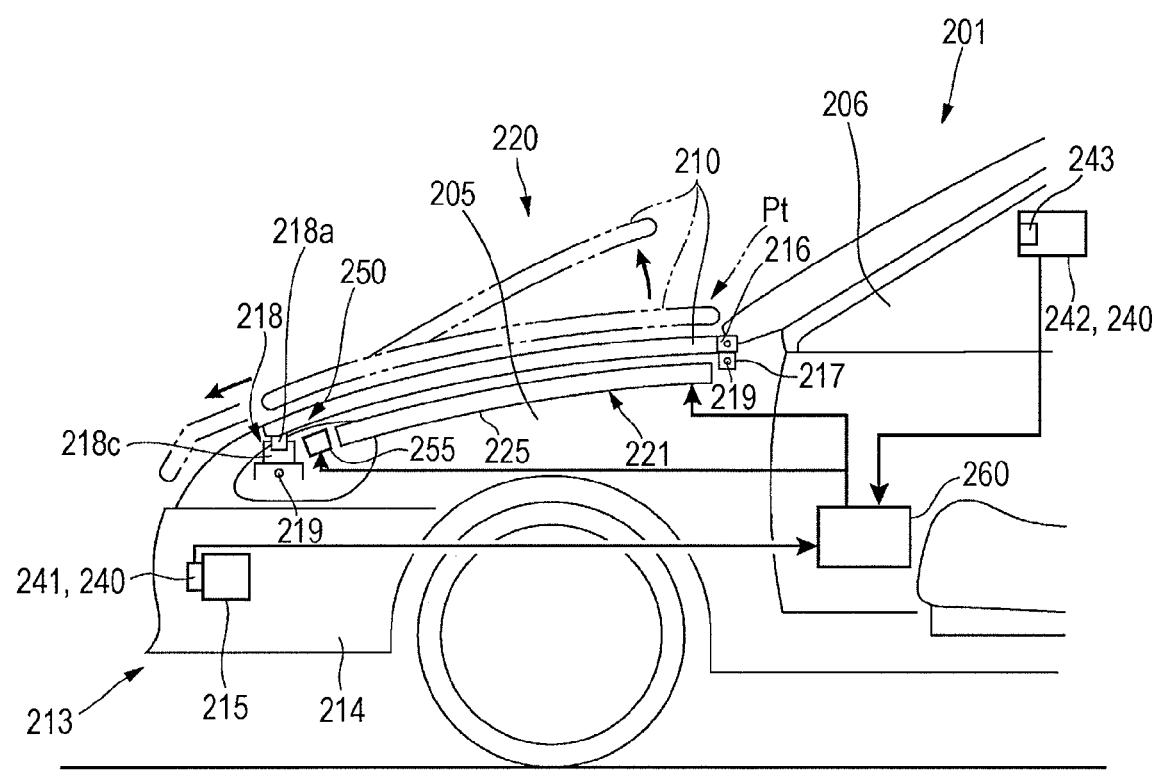
FIG. 22 is an explanatory diagram of the front side face of an automobile where a pedestrian protection apparatus for a vehicle according to an embodiment of the present invention is provided.
Figure 23:
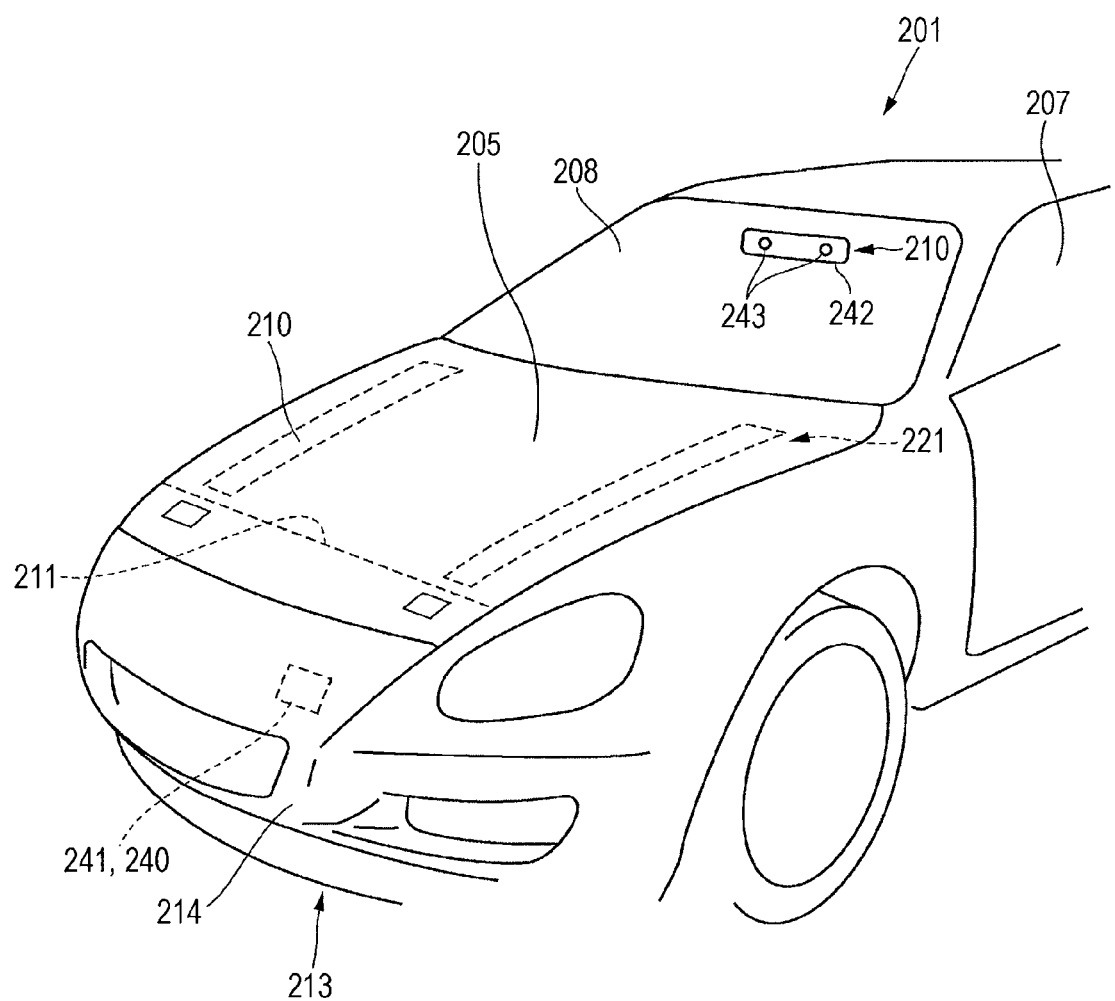
FIG. 23 is a perspective view of the automobile where a pedestrian protection apparatus for a vehicle is provided.
Figure 24:
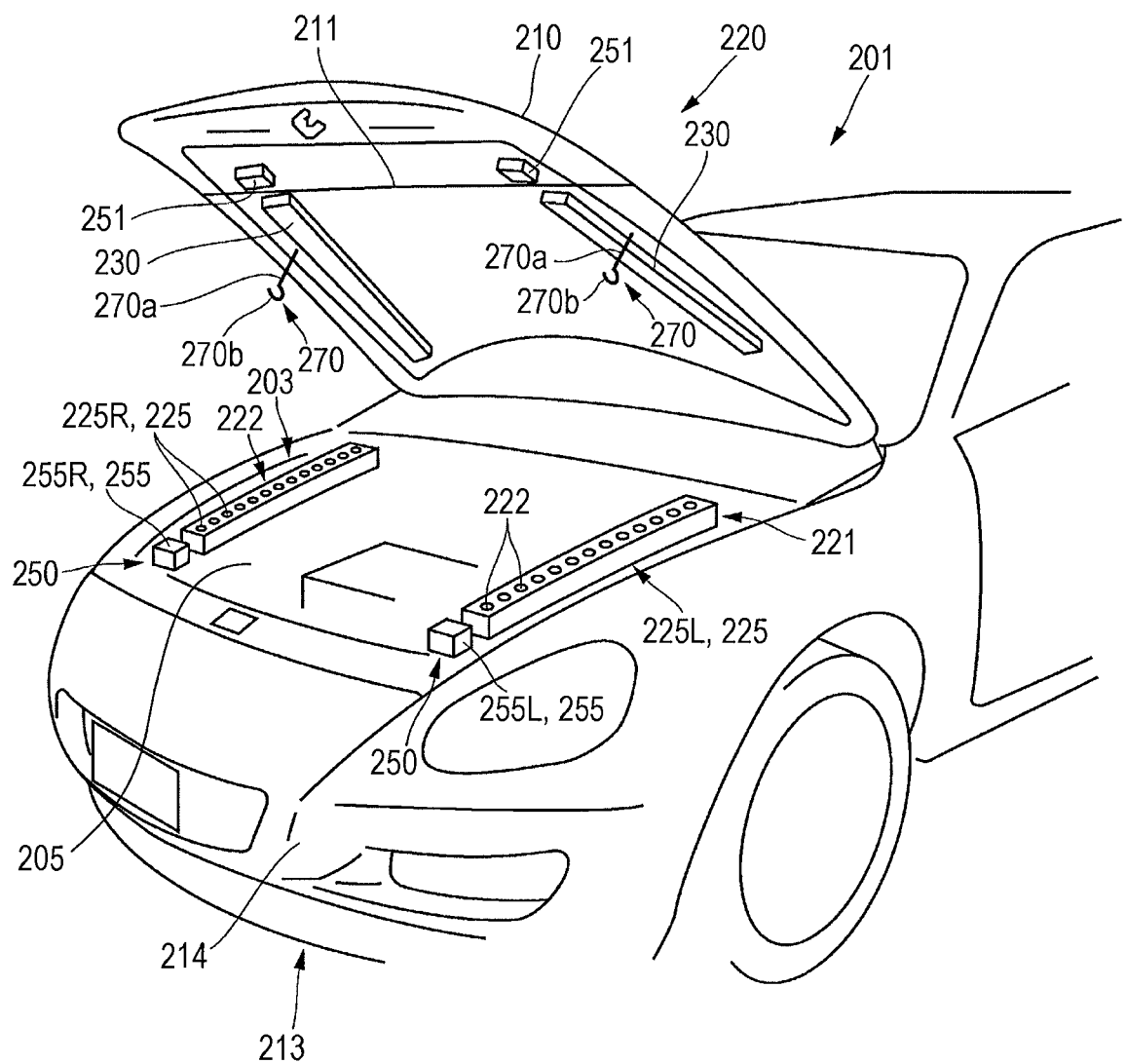
FIG. 24 is a perspective view of the front side of an automobile in a state in which the hood is opened.

With the front side of the body 203 of an automobile 201, as illustrated in FIGS. 22, 23, and 24, an engine room 205 is provided, and the upper portion of this engine room 205 is covered with a hood 210. A front bumper 213 is disposed in the front edge of the body 203, and the front bumper 213 includes a bumper face 214, and a bumper beam 215 (see FIG. 22) disposed in the inner side thereof extending in the vehicle-width direction. The bumper beam 215 is fixed to a body frame which is not illustrated, of which the shape and intensity have been designed to rebound in a direction where the shape is restored by elasticity at the time of collision of a collision object of interest (pedestrian).

The hood 210 is supported at the body 203 with opening-free/closing-free via a pair of hood hinges 216 (see FIG. 22) provided to both sides in the vehicle-width direction of the rear edge thereof. With the hood hinges 216, the tip sides thereof are connected to the rear face of the hood 210, and the rear edge sides are turnably connected to a seating 217 provided to the body 203. The front edge of the hood 210 is locked to the body side by a hood lock device 218. The hood lock device 218 includes a lock striker 218a provided to the hood side, and a latch 218c which is turnably provided to the body side and can lock and unlock the lock striker 218a.

The seating 217 and latch 218c are connected to the body 203 via a fracture bolt 219. These fracture bolts 219 are formed so as to be fractured when a pedestrian collides with the automobile 201 or the first magnet 230 is pulled upward as will be described later. Accordingly, the hood 210 thus is in a non-connected state as to the body 203, whereby the hood 210 can be moved independently of a supporting mechanism thereof. Note that, though FIG. 24 illustrates, for convenience of description, a state in which the front side of the hood 210 is opened upward with this rear edge side as a supporting point, at the time of driving, the hood 210 as illustrated in FIG. 23 is in a state covering the engine room 205, and is held by the hood hinges 216 and hood lock device 218.

Next, the overall configuration of the pedestrian protection apparatus for a vehicle will be described with reference to FIGS. 22 to 28. The pedestrian protection apparatus for a vehicle 220 is, as illustrated in FIG. 22, configured of the hood 210 covering the engine room 205, a moving device 221 configured to perform sliding movement of the hood 210, a pedestrian collision detecting device 240 configured to detect whether a pedestrian has collided with the automobile 201 or has a danger of colliding with the automobile 201, a deforming device 250 configured to deform the front side of the hood 210 into a state facing downward, and a controller 260 configured to perform sliding movement of the hood 210 as to the body 203 using the moving device 221 and also to deform the front side of the hood 210 in a state facing downward using the deforming device 250 when detection is made by the pedestrian collision detecting device 240 that a pedestrian has collided with the automobile 201 or has a danger of colliding with the automobile 201.

The hood 210 is, as illustrated in FIG. 23, formed in a generally rectangular shape from a plane view so as to cover above the engine room 205. A deformation originator 211 which serves as a deformation starting point when load is applied extending from one edge side to the other edge side in the width direction of the hood 210 is provided to the rear face of the front side of the hood 210. The deformation originator 211 is a fragile portion formed in a recessed shape at a side face view. Therefore, when load facing downward is applied to the front side of the hood 210, the front side of the hood 210 is deformed so as to be folded downward with the deformation originator 211 as a starting point.

Figure 26:
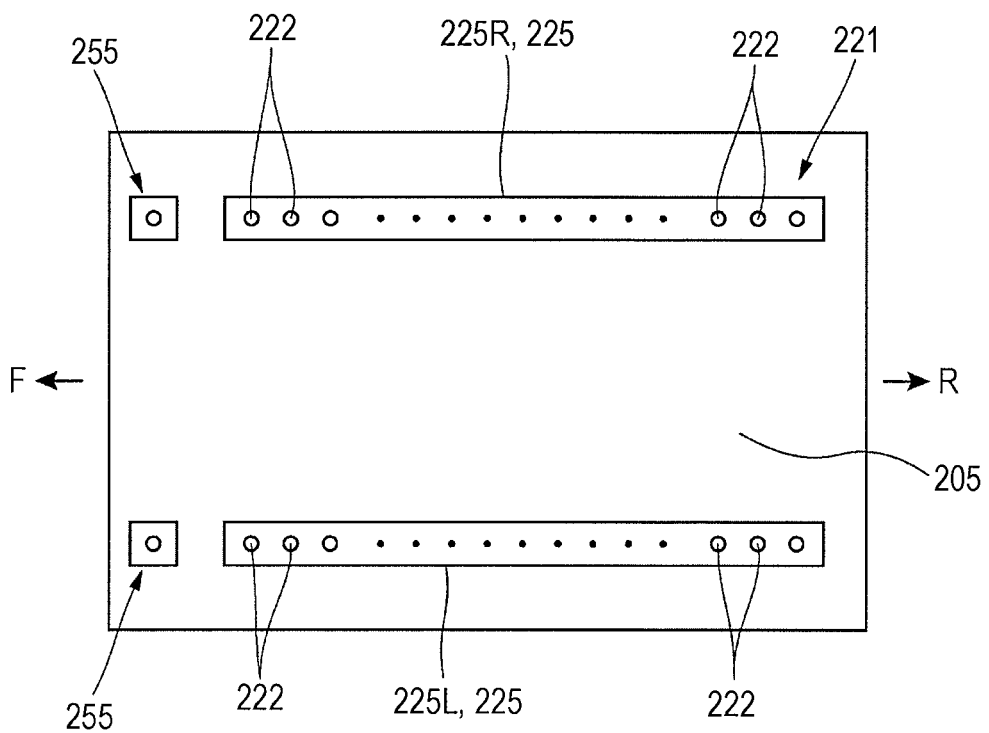
FIG. 26 is a configuration diagram of the vehicle body side of a moving device configured to move a hood.
Figure 27:
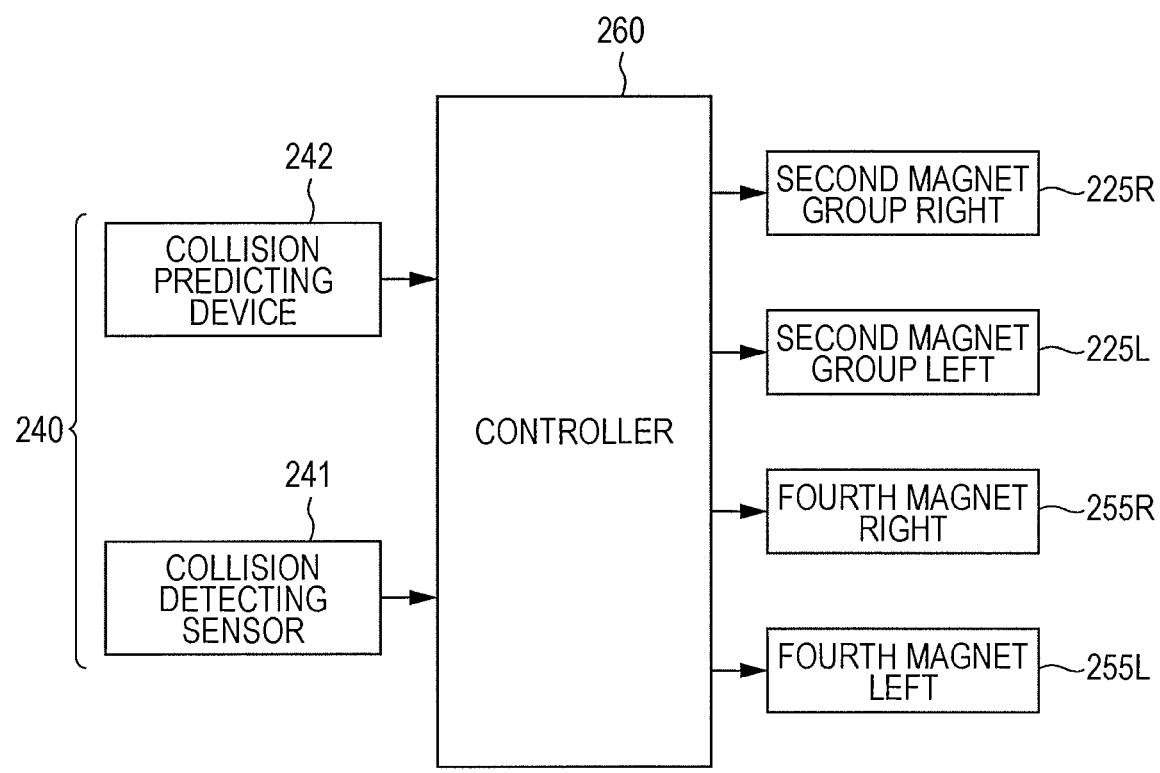
FIG. 27 is a block diagram of a pedestrian protection apparatus for a vehicle according to an embodiment of the present invention.

The moving device 221 includes, as illustrated in FIGS. 23, 24 and 26, a first magnet 230 disposed on both sides in the vehicle-width direction of the rear face of the hood 210, extending in the front/back direction, and multiple second magnets 222 disposed on both sides in the vehicle-width direction of the engine room 205, having a predetermined interval in the front/back direction. The first magnet 230 and second magnets 222 are disposed so as to face each other in a state in which the hood 210 covers the engine room 205. The first magnet 230 is a permanent magnet, and the second magnets 222 are electromagnets.

Figure 25:
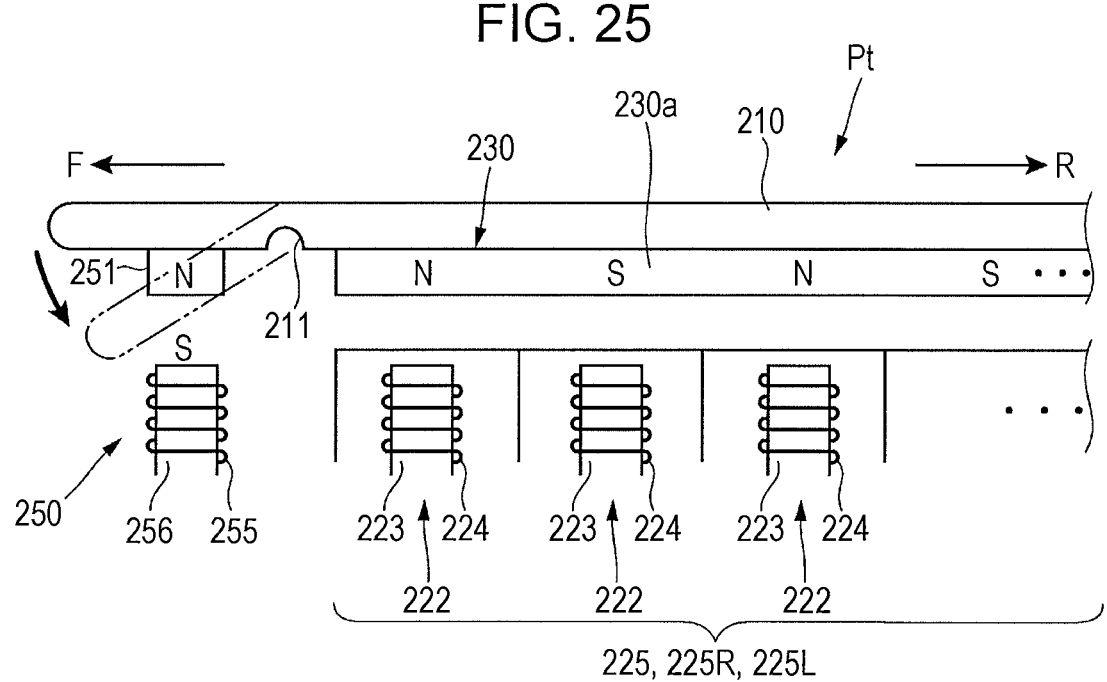
FIG. 25 is a configuration diagram of a moving device configured to move a hood.

The configurations of the first magnets 230 and second magnets 222 will be described with reference to FIG. 25. The first magnet 230 is, as illustrated in FIG. 25, a permanent magnet where an iron core 230a is extended in a rod shape, and magnetic poles (N pole and S pole) are provided from the front side to the rear side of the iron core 230a, having a predetermined interval. In the drawing, the N pole, S pole, N pole, and so on are provided from the vehicle front side toward the rear side of the iron core 230a.

The second magnets 222 are configured of a cylindrical iron core 223 being wound with a coil 224. The second magnets 222 make up a second magnet group 225 by a plurality thereof being arrayed in the front/back direction of the vehicle, having a predetermined interval. The second magnet group 225 is disposed in a position facing the first magnet 230. With the second magnet 222, in the event that the direction of current to flow into the coil 224 is controlled, the N pole or S pole occurs above the iron core 223. In the event that power supply to the second magnets 222 is controlled so that the magnetic poles of the second magnets 222 of the second magnet group 225 become the N pole or S pole, the hood 210 can be slid and moved in the front/back direction by attraction force between the N pole and S pole of the second magnet 222 and first magnet 230, and repelling force between the N poles and between the S poles.

The coils 224 of the second magnets 222 are electrically connected to a later-described controller 260. Note that, for convenience of description, the second magnet group 225 disposed on the right side in the vehicle-width direction (see FIG. 24) will be referred to as second magnet group right 225R, and the second magnet group 225 disposed on the left side in the vehicle-width direction (see FIG. 24) will be referred to as second magnet group left 225L. When supplying electric power to these second magnet group right 225R and second magnet group left 225L, the fracture bolt 219 illustrated in FIG. 22 is fractured by repelling force between the N poles/S poles of the second magnet 222 and first magnet 230, the hood 210 thus is in a non-connected state as to the body 203, and is in a state floating upward from a position covering the upper portion of the engine room 205 (hereafter, referred to as "normal position Pt") (see FIGS. 22 and 28B).

Next, the deforming device 250 will be described with reference to FIGS. 24 and 25. The deforming device 250 includes, as illustrated in FIGS. 24 and 25, a third magnet 251 provided to the rear faces of both edges in the front-side width direction of the hood 210, and a fourth magnet 255 provided to both edges in the front-side width direction of the engine room 205. The third magnet 251 is a permanent magnet, and the fourth magnet 255 is an electromagnet. Note that, for convenience of description, the fourth magnet 255 disposed on the right side in the vehicle-width direction (see FIG. 24) will be referred to as fourth magnet right 255R, and the fourth magnet 255 disposed on the left side in the vehicle-width direction (see FIG. 24) will be referred to as fourth magnet left 255L. The third magnet 251 is disposed more front side than the deformation originator 211 provided to the front side of the hood 210. The magnetic pole of the third magnet 251 is the same N pole as the magnetic pole of the front edge of the first magnet 230. Therefore, repelling force is affected between the magnetic poles of the first magnet 230 and third magnet 251, and accordingly, the front side of the hood 210 is not deformed downward by this magnetic force with the deformation originator 211 as a starting point. The third magnet 251 is disposed in a position facing the fourth magnet 255 when the hood 210 is in the normal position Pt.

The fourth magnets 255 are configured of a cylindrical iron core 256 being wound with a coil 257. Current in a direction where the magnetic pole of the edge face of the iron core 256 facing the third magnet 251 side becomes the S pole flows into the coil 257 of the fourth magnet 255. Therefore, when supplying electric power to the coil 257 of the fourth magnet 255, the front side of the hood 210 is deformed so as to be folded downward as illustrated in a dashed two-dotted line with the deformation originator 211 as a starting point by attraction force between the N pole of the third magnet 251 and the S pole of the fourth magnet 255.

Figure 28A:
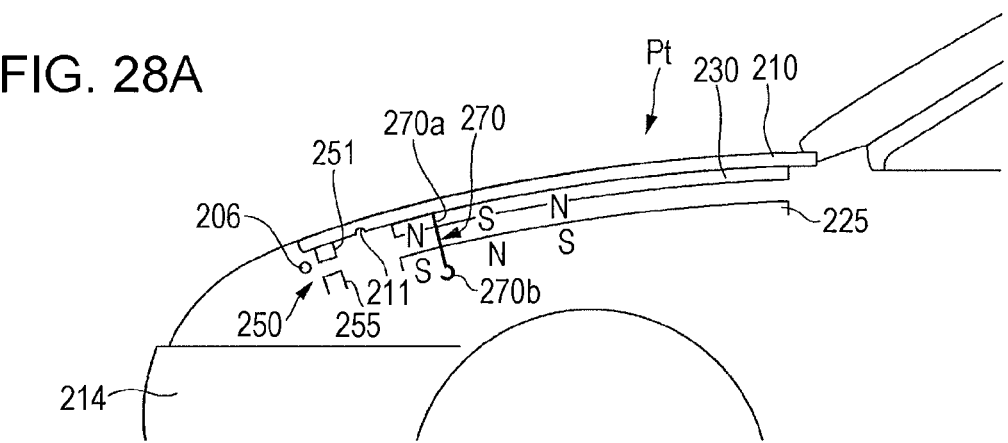
FIGS. 28A to 28C are explanatory diagrams of operation of a pedestrian protection apparatus for a vehicle according to an embodiment of the present invention.
Figure 28B:
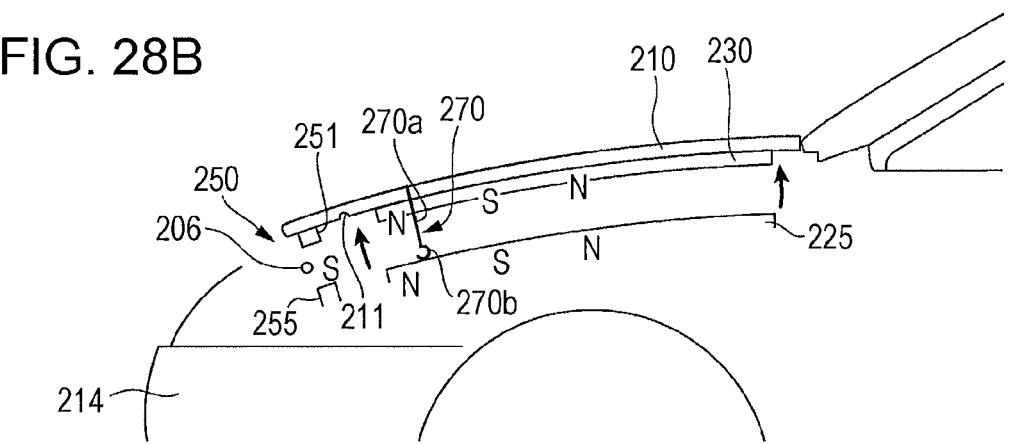

Next, description will be made regarding a motion conversion member 270 configured to regulate sliding movement in the vehicle front side direction of the hood 210, and also to rotate the rear side as to the front side of the hood 210 in the vertical direction, with reference to FIGS. 24 and 28A. The motion conversion member 270 is, as illustrated in FIGS. 24 and 28A, provided to the rear face of the hood 210 on the outer side in the hood width direction of each first magnet 230 provided to both sides in the width direction of the hood 210. The motion conversion member 270 includes an arm portion 270a extended from the rear face of the hood 210, and a hook portion 270b provided to the tip of the arm portion 270a. With the hook portion 270b, the front side is opened and formed in a curved manner, and is detachably locked to a shaft portion 206 provided in the engine room 205. The hook portion 270b is moved along with sliding movement to the vehicle front side of the hood 210 by the moving device 221 and is locked to the shaft portion 206. The shaft portion 206 is provided to both sides in the front side width direction within the engine room 205, and the shaft core direction extends toward the vehicle-width direction.

Next, the pedestrian collision detecting device 240 will be described with reference to FIGS. 22 and 23. The pedestrian collision detecting device 240 includes, as illustrated in FIGS. 22 and 23, a collision detecting sensor 241 attached to the front face of the bumper beam 215, and a collision predicting device 242 disposed within the vehicle room 207. The collision detecting sensor 241 outputs an electric signal according to the magnitude of collision load. The collision predicting device 242 includes a camera 243 disposed in the central portion in the vehicle-width direction on the rear face side of the front glass 208 within the vehicle room 207, and is configured to predict whether or not a pedestrian has a danger of colliding with the automobile 201 from an imaged image in front of the vehicle taken by this camera 243, and to output this.

Next, a controller 260 will be described. The controller 260 supplies, as illustrated in FIG. 25, electric power to the second magnet group right 225R, second magnet group left 225L, fourth magnet right 255R, and fourth magnet left 255L according to a detection signal from the collision detecting sensor 241 and collision predicting device 242, or blocks power supply thereto. Specifically, when receiving an electric signal corresponding to collision load from the collision detecting sensor 241, or an electric signal regarding a pedestrian having a danger of colliding with the automobile 201, the controller 260 determines whether this electric signal corresponds to collision load at the time of collision of a pedestrian or regarding a pedestrian having a danger of colliding with the automobile 201, and in the event of determining either thereof, as illustrated in FIGS. 25 and 28A, controls power supply to each of the second magnets 222 so that the magnetic pole of each of the second magnets 222 of the second magnet group right 225R and second magnet group left 225L becomes the same magnetic pole as the magnetic pole of the corresponding first magnet 230.

Figure 28C:
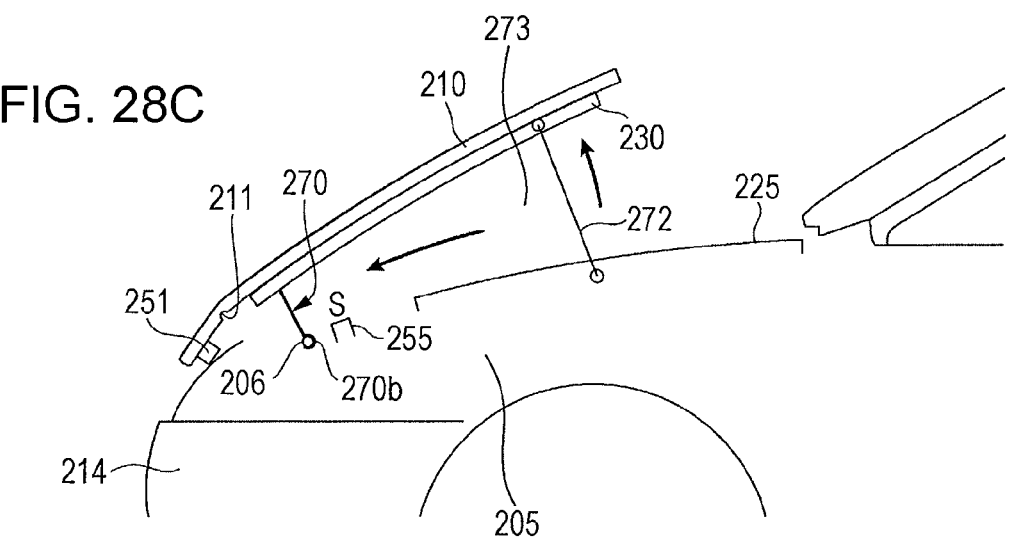

Now, when the fracture bolt 219 is fractured by collision load at the time of collision, or is fractured by movement upward of the hood 210 at the time of having a danger of collision, the hood 210 can move independently of these supporting mechanisms. Accordingly, the hood 210 is pulled upward from the normal position Pt (see FIG. 28B). The controller 260 performs control so that the magnetic pole of each of the second magnets 222 of the second magnet group right 225R and second magnet group left 225L becomes the N pole or S pole to move the hood 210 to the front side. Simultaneously therewith, the controller 260 supplies electric power to the fourth magnet right 255R and fourth magnet left 255L of the deforming device 250 to change the magnetic pole on the upper side of the fourth magnet 255 to the S pole. Accordingly, the front side of the hood 210 is, as illustrated in FIG. 28C, deformed so as to be folded downward with the deformation originator 211 as a starting point by attraction force between the third magnet 251 and fourth magnet 255.

Also, along with sliding movement to the vehicle front side of the hood 210, the hook portion 270b of the motion conversion member 270 is locked to the shaft portion 206 within the engine room 205, the hood 210 is regulated on movement to the front side, and also turns the rear side of the hood 210 upward as to the front side with the shaft portion 206 as a turning supporting point.

Accordingly, with the hood 210, the front side thereof moves to the body front side in a state folded downward, and also the entire hood 210 assumes a posture inclined to the front side. Therefore, when a pedestrian collides with the automobile 201 and runs on the hood 210, the front edge of the hood 210 does not have a danger of colliding with the pedestrian, and also the pedestrian readily collides with the hood 210, whereby shock absorption percentage of the hood 210 can be increased.

Note that at the time of inclining the hood 210 to the front side, a supporting member 272 maintaining the posture thereof may be provided to the hood 210, whereby a great space portion 273 can be formed between the hood 210 and engine room 205. Accordingly, deformation of the hood 210 is facilitated, shock at the time of a pedestrian falling onto the hood 210 can be absorbed by the hood 210 in a sure manner.

Note that, with the above-mentioned embodiment, though there has been illustrated an example where the front side of the hood 210 is configured so as to be folded, an arrangement may be made in which multiple deformation originators extending in the hood-width direction on the front side of the hood 210 are provided in the front/back direction of the hood 210 with a predetermined interval, the entirety on the front side of the hood 210 is deformed in a curved manner at the time of folding of the hood 210.

Also, the deforming device 250 is not restricted to a device configured of a magnet, and may be a string member such as a chain or the like which connects the front side of the hood 210 and the engine room 205. Also, with the above-mentioned embodiment, though the first magnet 230 configured of a permanent magnet has been attached to the hood 210 side, and the second magnets 222 which are electromagnets have been provided to the engine room 205 side, these may be inversely provided, i.e., the first magnet 230 configured of a permanent magnet is provided to the engine room 205 side, and the second magnets 222 which are electromagnets are provided to the hood 210 side. Also, with the above-mentioned embodiment, though the third magnet 251 configured of a permanent magnet has been described as being attached to the hood 210 side, and the fourth magnets 255 which are electromagnets have been provided to the engine room 205 side, these may be inversely provided, i.e., the third magnet 251 configured of a permanent magnet is provided to the engine room 205 side, and the fourth magnets 255 which are electromagnets are provided to the hood 210 side. Further, with the above-mentioned embodiment, there has been illustrated a case where sliding movement of the hood 210 is performed by the pedestrian protection apparatus for a vehicle 220, the side doors, hatch, or roof of the vehicle may be made to be moved.

What is claimed is:

1. A vehicle hood moving device for a vehicle hood movably supported at a vehicle body front, comprising:
   two or more first magnets disposed on each side of the vehicle hood in a vehicle-width direction, with the two or more first magnets on each side separated from one another by a predetermined length in a vehicle front-back direction;
   two or more second magnets disposed on each side of an engine room in the vehicle-width direction, with the two or more second magnets on each side separated from one another by the predetermined length in the vehicle front-back direction at positions facing the first magnets;
   a pedestrian collision detector configured to detect whether a pedestrian has collided with the vehicle or has a danger of colliding with the vehicle; and
   a hood movement controller configured to move the vehicle hood in the event that a detection is made by the pedestrian collision detector that a pedestrian has collided with the vehicle or has a danger of colliding with the vehicle, wherein
   in corresponding pairs of first magnets and second magnets, at least one of the first magnet and the second magnet is an electromagnet, and the hood movement controller is configured to move the vehicle hood by controlling a supply of electrical power to the electromagnet, such that the vehicle hood moving device moves the vehicle hood relative to the vehicle body by a magnetic force controlled by the hood movement controller.

2. The vehicle hood moving device according to claim 1, wherein
   a linear motor is configured of the first magnets and the second magnets; and
   the hood movement controller controls, in the event that a detection is made by the pedestrian collision detector that a pedestrian has collided with the vehicle or has a danger of colliding with the vehicle, a switching of excitation of the electromagnet of the first magnets and the second magnets to move the vehicle hood relative to the vehicle body.

3. The vehicle hood moving device according to claim 1, wherein
   a rear side of the vehicle hood is rotatably supported in the vertical direction relative to a front side of the vehicle hood via a hinge mechanism included in a vehicle body front;
   at least one of either a first magnet or a second magnet is provided to the hinge mechanism, and at least one of the other of a first magnet and a second magnet is provided to the vehicle body front; and
   the hood movement controller excites, in the event that a detection is made by the pedestrian collision detector that a pedestrian has collided with the vehicle or has a danger of colliding with the vehicle, the electromagnet of the first magnet and the second magnet to move the rear side of the vehicle hood upward relative to the front side of the vehicle hood along with the hinge mechanism.

4. The vehicle hood moving device according to claim 1, wherein
   the hood movement controller is configured to move the vehicle hood in a manner that at least one of a front side and a rear side of the vehicle hood is moved in an upward direction in the event that a detection is made by the pedestrian collision detector that a pedestrian has collided with the vehicle or has a danger of colliding with the vehicle.

5. The vehicle hood moving device according to claim 4, wherein
   the hood movement controller is configured to move the vehicle hood in a manner that both the front side and the rear side of the vehicle hood are moved in an upward direction in the event that a detection is made by the pedestrian collision detector that a pedestrian has collided with the vehicle or has a danger of colliding with the vehicle.

6. The vehicle hood moving device according to claim 1, wherein
the hood movement controller is configured to move the vehicle hood in a manner that at least one of a front side and a rear side of the vehicle hood is moved in a downward direction in the event that a detection is made by the pedestrian collision detector that a pedestrian has collided with the vehicle or has a danger of colliding with the vehicle.

7. The vehicle hood moving device according to claim 6, wherein
the hood movement controller is configured to move the vehicle hood in a manner that both the front side and the rear side of the vehicle hood are moved in a downward direction in the event that a detection is made by the pedestrian collision detector that a pedestrian has collided with the vehicle or has a danger of colliding with the vehicle.

8. The vehicle hood moving device according to claim 1, wherein
the hood movement controller is configured to move the vehicle hood in a manner that at least one of a front side and a rear side of the vehicle hood is moved in an upward direction, and the other of the front side and the rear side of the vehicle hood is moved in a downward direction, in the event that a detection is made by the pedestrian collision detector that a pedestrian has collided with the vehicle or has a danger of colliding with the vehicle.

9. The vehicle hood moving device according to claim 1, wherein
the hood movement controller is configured to control the supply of electrical power to the electromagnet in a pair of a first magnet and a corresponding second magnet by permitting the supply of electrical power to the electromagnet in the event that a detection is made by the pedestrian collision detector that a pedestrian has collided with the vehicle or has a danger of colliding with the vehicle.

10. The vehicle hood moving device according to claim 1, wherein
the hood movement controller is configured to control the supply of electrical power to the electromagnet in a pair of a first magnet and a corresponding second magnet by blocking the supply of electrical power to the electromagnet in the event that a detection is made by the pedestrian collision detector that a pedestrian has collided with the vehicle or has a danger of colliding with the vehicle.

11. The vehicle hood moving device according to claim 1, wherein
the hood movement controller is configured to control movement of the vehicle hood, in the event that a detection is made by the pedestrian collision detector that a pedestrian has collided with the vehicle or has a danger of colliding with the vehicle, by: controlling a first supply of electrical power to a first pair of a first magnet and a corresponding second magnet, and controlling a second supply of electrical power to a second pair of a first magnet and a corresponding second magnet
the first pair of a first magnet and a corresponding second magnet being spaced from the second pair of a first magnet and a corresponding second magnet in a front-back direction of the vehicle, and
the second supply of electrical power having a reverse current relative to a current of the first supply of electrical power.

12. The vehicle hood moving device according to claim 1, wherein
the hood movement controller is configured to control movement of the vehicle hood in a manner to adjust the angle of the vehicle hood based on the magnitude of a detected collision load or the magnitude of a predicted collision load.

13. A vehicle hood moving device for a vehicle hood movably supported at a vehicle body front, comprising:
a plurality of first magnets disposed in the vehicle hood, the plurality of first magnets including a corner magnet for each corner of the vehicle hood, with each corner magnet being positioned closer to a respective corner of the vehicle hood than to the other corners of the vehicle hood;
a plurality of second magnets disposed in the vehicle body at positions facing the first magnets; and
a pedestrian collision detector configured to detect whether a pedestrian has collided with the vehicle or has a danger of colliding with the vehicle; wherein
the vehicle hood moving device moves the vehicle hood relative to the vehicle body by magnetic force of at least one first magnet and one second magnet in the event that a detection is made by the pedestrian collision detector that a pedestrian has collided with the vehicle or has a danger of colliding with the vehicle.

14. The vehicle hood moving device according to claim 13, further comprising
an electromagnetic field suppression member disposed so as to cover, in a corresponding pair of first and second magnets, at least one of the first magnet and the second magnet; and
the electromagnetic field suppression member covers a portion excluding a surface where the first magnet and the second magnet face.

15. The vehicle hood moving device according to claim 13, wherein
the plurality of first magnets further includes magnets positioned at intermediate positions between the corner magnets.

16. The vehicle hood moving device according to claim 15, wherein
the magnets positioned at intermediate positions are positioned at center positions between the corner magnets.

17. The vehicle hood moving device according to claim 13, wherein
the plurality of first magnets includes a right-front magnet, a right-rear magnet, a left-front magnet, and a left-rear magnet.

18. The vehicle hood moving device according to claim 17, wherein
the plurality of first magnets further includes a right-center magnet and a left-center magnet.

19. A pedestrian protection apparatus for a vehicle comprising:
a vehicle hood held in the inner side of a pair of fenders disposed on both sides in the vehicle-width direction on a vehicle body front side of a vehicle;
a plurality of moving units configured to move the vehicle hood;
a pedestrian collision detector configured to detect whether a pedestrian has collided with the vehicle or has a danger of colliding with the vehicle; and
a hood movement controller configured to control operation of the moving units according to a detection signal from the pedestrian collision detector; wherein the hood movement controller controls, in the event that a detection is made by the pedestrian collision detector that a pedestrian has collided with the vehicle or has a danger of colliding with the vehicle, operation of the moving units to actively move the vehicle hood closer to an inner side of the vehicle body than a state of the vehicle hood before the detection, with at least part of the vehicle hood moved to a position that is further downward than the pair of fenders.

* * * * *